(12) United States Patent
Cong et al.

(10) Patent No.: US 12,738,732 B2
(45) Date of Patent: Sep. 15, 2026

(54) POWER SUPPLY SYSTEM AND POWER SUPPLY METHOD

(71) Applicant: Delta Electronics (Shanghai) Co., Ltd., Shanghai (CN)

(72) Inventors: Wulong Cong, Shanghai (CN); Yiqing Ye, Shanghai (CN); Min Zhou, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 369 days.

(21) Appl. No.: 18/332,765

(22) Filed: Jun. 12, 2023

(65) Prior Publication Data

US 2023/0411957 A1 Dec. 21, 2023

(30) Foreign Application Priority Data

Jun. 15, 2022 (CN) ......................... 202210678025.1

(51) Int. Cl.
*H02J 1/10* (2026.01)
*G06F 1/188* (2026.01)
*H02M 3/158* (2006.01)

(52) U.S. Cl.
CPC ............. *H02J 1/10* (2013.01); *H02M 3/1584* (2013.01); *G06F 1/188* (2013.01)

(58) Field of Classification Search
CPC .... H02J 1/10; H02J 1/082; H02J 1/00; H02M 3/1584; H02M 1/0058; H02M 1/007; H02M 3/33569; H02M 1/0048; H02M 3/01; H02M 3/33576; G06F 1/188; G06F 1/26; G06F 1/32
USPC ......................................................... 323/272
See application file for complete search history.

(56) References Cited

U.S. PATENT DOCUMENTS

| | | | |
|---|---|---|---|
| 10,504,848 B1 * | 12/2019 | Parto | H01L 23/5389 |
| 11,101,795 B1 * | 8/2021 | Vinciarelli | H02M 3/33576 |
| 2003/0039092 A1 | 2/2003 | Kanouda et al. | |
| 2019/0235590 A1 * | 8/2019 | Ye | H02M 3/02 |
| 2020/0366091 A1 | 11/2020 | Ye et al. | |
| 2021/0288576 A1 | 9/2021 | Rizzolatti et al. | |

FOREIGN PATENT DOCUMENTS

| | | |
|---|---|---|
| CN | 103580281 A | 2/2014 |
| CN | 110112905 A | 8/2019 |
| EP | 3879684 A1 | 9/2021 |

* cited by examiner

*Primary Examiner* — Thienvu V Tran
*Assistant Examiner* — Lauren Ashley Shaw
(74) *Attorney, Agent, or Firm* — CKC & Partners Co., LLC

(57) ABSTRACT

The present invention discloses a power supply system and a power supply method. The power supply system includes: a load region, a load disposed in the load region, at least two preceding-stage power supply regions disposed around the load region, preceding-stage power modules disposed in the at least two preceding-stage power supply regions, at least two post-stage power supply regions disposed around the load region, and post-stage power modules disposed in the at least two post-stage power supply regions. The at least two preceding-stage power supply regions and the at least two post-stage power supply regions are arranged in a staggered manner. The preceding-stage power module and the post-stage power module are cascaded to supply power to the load.

20 Claims, 21 Drawing Sheets

POWER SUPPLY SYSTEM AND POWER SUPPLY METHOD

CROSS REFERENCE TO RELATED APPLICATION

This application claims the benefit of priority to Chinese Application No. 202210678025.1, filed on Jun. 15, 2022, the content of which is incorporated herein by reference in its entirety.

BACKGROUND OF THE INVENTION

1. Field of the Invention

The present invention relates to a power supply technology, and particularly, to a power supply system and a power supply method.

2. Related Art

With the improving performance of data center servers, and in particular rapid developments in AI servers, data center servers with a 48V input voltage are gradually replacing data center servers with a 12V input voltage and will become mainstream servers in the future. Increase of the input voltage from 12V to 48V brings a new challenge to power supply architectures of servers, such as a CPU, a GPU and a DPU.

The power supply architecture of the server with the 48V input voltage includes a single-stage architecture and a two-stage architecture. In the single-stage architecture, power modules have a large size so that the power modules are far away from the XPU, thereby resulting in a larger loss over a delivery path. In addition, dynamic performance of the power modules in the single-stage power supply architecture scarcely meets growing demands for high dynamic performance in servers. Therefore, more and more manufactures are employing the two-stage power supply architecture. In the two-stage architecture, the 48V input voltage is lowered to an intermediate voltage via a preceding-stage power supply, and then the intermediate voltage is lowered to a voltage required by a load via a post-stage power supply. The load may be the XPU in the server.

FIG. 1 shows a schematic diagram of a conventional two-stage power supply architecture 100'. Referring to FIG. 1, the two-stage power supply architecture 100' includes a preceding-stage power supply 10' and a post-stage power supply 20'. The preceding-stage power supply 10' may include a plurality of preceding-stage power supply modules FE1, FE2, . . . , FEn, and the post-stage power supply 20' may include a plurality of post-stage power supply modules BE1, BE2, . . . , BEn. The preceding-stage power supply 10' converts an input voltage Vin to a certain intermediate bus voltage Vbus. The post-stage power supply 20' converts the intermediate bus voltage Vbus into a voltage Vcore and then supplies power to a load 30'. Both the preceding-stage power supply 10' and the post-stage power supply 20' are disposed on a carrier, such as a PCB board. An output of the preceding-stage power supply 10' is connected to the input of the post-stage power supply 20' through traces on the carrier which form an intermediate bus. A current flows from the preceding-stage power supply module to the post-stage power supply module through the intermediate bus. Generally, the traces on the carrier are defined as a power delivery network (PDN) or referred to as a delivery path. The traces between the preceding stage and the post stage are defined as a power delivery network PDN1, and the traces between the post stage and the load are defined as a power delivery network PDN2. The power delivery network PDN1 has a resistance of $R_{PDN1}$, and the power delivery network PDN2 has a resistance of $R_{PDN2}$. The current flowing through the PDN1 is defined as $i_{BUS}$ that is the current flowing through the intermediate bus.

The two-stage power supply architecture for supplying power to the load includes a plurality of layout configurations on the carrier. In a first layout configuration, both the preceding-stage power supply and the post-stage power supply are disposed on the same side of the load. In such a layout configuration, not only power traces for supplying power, but also a large number of signal traces and vias are around the load (such as the XPU in the servers). In such a case, a region left for the power supply modules on a certain side of the load is relatively small. When all the post-stage power supply modules and the preceding-stage power supply modules are to be arranged in the region, a distance from the preceding-stage power supply module to the load and a distance from the post-stage power supply module to the load are long. As the input voltage of the XPU in the servers gets lower and lower with the market demand, the loss over the delivery path from the post-stage power supply modules to the load is increasing.

To reduce the resistance $R_{PDN2}$ between the post-stage power supply modules and the load so as to reduce the delivery loss between the post-stage power supply modules and the load, the distance between the post-stage power supply modules and the load has to be as short as possible. FIG. 2 shows a second layout configuration of the conventional two-stage power supply architecture. As shown in FIG. 2, the load (such as the XPU in the servers) is disposed in a load region 201'. The region around the load is divided into two parts. A first region 202' on the left in which the preceding-stage power supply modules are disposed, and the remaining upper, lower and right regions are second regions 203' in which the post-stage power supply modules are disposed. For example, as shown in FIG. 2, the post-stage power supply modules are disposed in the upper and lower regions. In the first region 202', one or more preceding-stage power supply modules may be provided and welded on the carrier (such as the PCB board). Further, in the second region 203', one or more post-stage power supply modules may be provided and welded on the same carrier.

In the second layout configuration, the distance between the post-stage power supply modules and the load is greatly shorter than that in the first layout configuration. However, since the preceding-stage power supply modules and the post-stage power supply modules are arranged in two different regions, the distance between the preceding-stage power supply modules and the post-stage power supply modules becomes longer, such that the loss over the delivery path between the preceding stage and the post stage becomes one of the main issues. FIG. 3 shows typical current densities at respective positions around the load in the second layout configuration. Here, "preceding" refers to a preceding-stage power supply region, and "post" refers to a post-stage power supply region. In the second layout configuration, although the resistance $R_{PDN1}$ of the intermediate bus is of the order of micro-ohm or even milliohm, the current $i_{BUS}$ flowing through the intermediate bus is large due to a large power of the XPU, such as 500 W. As a result, the loss over the delivery path between the preceding stage and the post stage can't be ignored.

In the second layout configuration, assuming that the output power of the preceding-stage power supply module is 500 W, Vbus is 5 V, and $R_{PDN1}$ is about 500 μΩ, the loss over the delivery path between the preceding stage and the post stage accounts for about 1% of the output power of the preceding stage. However, when the output power of the preceding stage is kept constant and the voltage Vbus is reduced to 3.3 V, the ratio of the above loss will be increased sharply to 2.3%. FIG. 4 shows a relationship between the impedance and the loss over delivery path in the second layout configuration.

Therefore, in the second layout configuration, the preceding-stage power supply modules and the post-stage power supply modules are cascaded in their respective regions, which may lead to a high local current density on the bus between the preceding-stage power supply modules and the post-stage power supply modules, resulting in a relatively large delivery loss and thus affecting efficiency of the overall power supply.

In view of above, there is an urgent demand for a layout configuration that reduces the current density of the intermediate bus and the loss over the delivery path.

SUMMARY OF THE INVENTION

The objective of the present invention is to provide a power supply system and a power supply method, which effectively solve at least one defect of the prior art.

In order to achieve the objective, the present invention provides a power supply system including a load region, and a load disposed in the load region; at least two preceding-stage power supply regions disposed around the load region; preceding-stage power modules disposed in the at least two preceding-stage power supply regions; at least two post-stage power supply regions disposed around the load region; and post-stage power supply modules disposed in the at least two post-stage power supply regions. The at least two preceding-stage power supply regions and the at least two post-stage power supply regions are arranged in a staggered manner. The preceding-stage power module and the post-stage power module are cascaded to supply power to the load.

According to one embodiment of the present invention, the at least two preceding-stage power supply regions are distributed in an axisymmetric manner with respect to the load region.

According to one embodiment of the present invention, the at least two post-stage power supply regions are distributed in an axisymmetric manner with respect to the load region.

According to one embodiment of the present invention, the power supply system includes a first preceding-stage power supply region, a second preceding-stage power supply region, a first post-stage power supply region and a second post-stage power supply region. The first post-stage power supply region and the second post-stage power supply region are distributed in an axisymmetric manner with respect to the load region; and the first preceding-stage power supply region and the second preceding-stage power supply region are distributed in an axisymmetric manner with respect to the load region.

According to one embodiment of the present invention, the at least two preceding-stage power supply regions are distributed in a centrosymmetric manner with respect to the load region.

According to one embodiment of the present invention, the at least two post-stage power supply regions are distributed in a centrosymmetric manner with respect to the load region.

According to one embodiment of the present invention, the at least two preceding-stage power supply regions are distributed in an axisymmetric manner with respect to the load region, and the at least two post-stage power supply regions are distributed in a centrosymmetric manner with respect to the load region. Alternatively, the at least two preceding-stage power supply regions are distributed in a centrosymmetric manner with respect to the load region, and the at least two post-stage power supply regions are distributed in an axisymmetric manner with respect to the load region.

According to one embodiment of the present invention, the at least two preceding-stage power supply regions are evenly distributed around the load region.

According to one embodiment of the present invention, the at least two post-stage power supply regions are evenly distributed around the load region.

According to one embodiment of the present invention, a length of at least one of the post-stage power supply regions is greater than or equal to that of at least one of the preceding-stage power supply regions.

According to one embodiment of the present invention, the preceding-stage power module is electrically connected to the post-stage power module through a first power delivery network, and the post-stage power module is electrically connected to the load through a second power delivery network.

According to one embodiment of the present invention, the load region includes a plurality of loads, and the plurality of loads work coordinately.

According to one embodiment of the present invention, the power supply system further includes a first carrier, and the load is disposed on the first carrier.

According to one embodiment of the present invention, the preceding-stage power module and the post-stage power module are disposed on the first carrier.

According to one embodiment of the present invention, at least one of the post-stage power modules is positioned on a first surface of the first carrier, and at least one of the preceding-stage power modules is positioned on a second surface of the first carrier.

According to one embodiment of the present invention, the power supply system includes a first carrier and a second carrier, the first carrier is disposed on the second carrier, and the preceding-stage power module and/or the post-stage power supply module are disposed on the second carrier.

According to one embodiment of the present invention, each of the preceding-stage power supply regions includes a plurality of the preceding-stage power modules, and there is a constant space between any adjacent preceding-stage power modules; and each of the post-stage power supply regions includes a plurality of the post-stage power modules, and there is a constant space between any adjacent post-stage power modules.

According to one embodiment of the present invention, the space between the adjacent preceding-stage power modules is a first gap, and the first gap is less than one fifth of a length of the preceding-stage power module.

According to one embodiment of the present invention, the space between the adjacent post-stage power modules is a second gap, and the second gap is less than one fifth of a length of the post-stage power module.

According to one embodiment of the present invention, the post-stage power module is a regulated DC/DC circuit, and the preceding-stage power module is an unregulated DC/DC circuit.

According to one embodiment of the present invention, the post-stage power module is an unregulated DC/DC circuit, and the preceding-stage power module is a regulated DC/DC circuit.

According to one embodiment of the present invention, the post-stage power module includes a secondary-side circuit of an unregulated DC/DC circuit, and the preceding-stage power module includes a primary-side circuit of the unregulated DC/DC circuit.

According to one embodiment of the present invention, an impedance of the post-stage power supply region is greater than or equal to an impedance of the preceding-stage power supply region.

According to one embodiment of the present invention, a ratio of a distance between the post-stage power module and the load region to a perimeter of the load region is less than 10%.

According to one embodiment of the present invention, a ratio of a distance between the preceding-stage power module and the load region to the perimeter of the load region is less than 25%.

In order to achieve the objective, the present invention further provides a power supply method including the steps of: configuring the above-mentioned power supply system; and supplying power to a load by the power supply system.

Some additional aspects and advantages of the present invention will be illustrated in the following description, and some of them would become clear from the description below or would be acquired through the practice of the present invention.

BRIEF DESCRIPTION OF THE DRAWINGS

These and additional features and advantages of the present invention will be more fully apparent in view of the following detailed description of embodiments thereof, in combination with the drawings in which.

DETAILED EMBODIMENTS OF THE INVENTION

Figure 1:
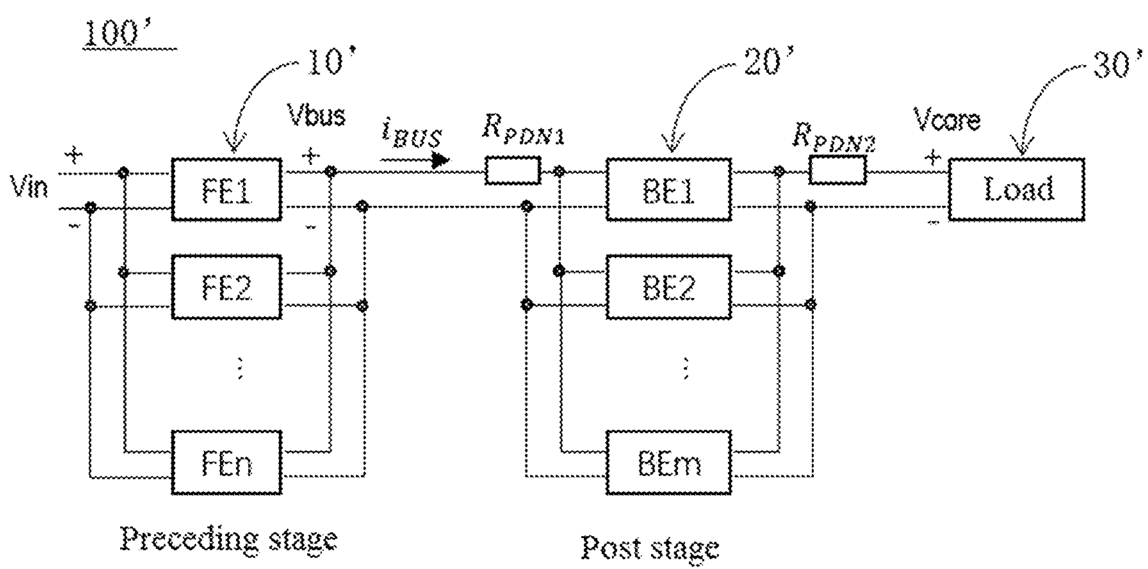
FIG. 1 is a schematic diagram showing a conventional two-stage power supply architecture.

Exemplary embodiments will now be described more fully with reference to the accompanying drawings. However, the exemplary embodiments may be implemented in many forms and should not be construed as limited to the embodiments set forth herein. On the contrary, these exemplary embodiments are provided so that this invention will be comprehensive and complete, and the conception of exemplary embodiments will be fully conveyed to those skilled in the art. In the drawings, the same reference numerals denote the same or similar structures, and thus detailed descriptions thereof will be omitted.

For introduction of the elements/components/etc. described and/or illustrated herein, the terms “one”, “a/an”, “the”, “said” and “at least one” are construed to indicate the presence of one or more elements/components/etc. The terms “include”, “include” and “have” are open-class words meaning inclusion and imply the possible existence of elements/components/etc. other than the elements/components/etc. specified herein. In addition, the terms “first”, “second” and other similar words in claims are only used as reference signs instead of being construed as numeral limitation of their objects.

The present invention provides a power supply system. The power supply system includes a load region, at least two preceding-stage power supply regions and at least two post-stage power supply regions. The at least two preceding-stage power supply regions are disposed around the load region, and the at least two post-stage power supply regions are disposed around the load region. The at least two preceding-stage power supply regions and the at least two post-stage power supply regions are arranged in a staggered manner. Preceding-stage power modules are disposed in the at least two preceding-stage power supply regions; and post-stage power modules are disposed in the at least two post-stage power supply regions. The preceding-stage power modules and the post-stage power modules are cascaded to supply power to the load disposed in the load region. Specifically, the preceding-stage power modules transfer power to the post-stage power modules, and the post-stage power modules transfer power to the load.

The power supply system has the two-stage power supply architecture and a distributed layout. The preceding-stage power modules and the post-stage power modules are in a staggered arrangement, thereby greatly reducing the current density of an intermediate bus between the preceding stage and the post stage and reducing loss over the corresponding delivery path.

According to some embodiments of the present invention, the at least two preceding-stage power supply regions are distributed in an axisymmetric manner. The at least two post-stage power supply regions are distributed in an axisymmetric manner. For example, two preceding-stage power supply regions and two post-stage power supply regions are provided, the two post-stage power supply regions may be arranged on opposite sides of the load region and distributed in an axisymmetric manner with respect to the load region, and the two preceding-stage power supply regions may be arranged on opposite sides of the load region and distributed in an axisymmetric manner with respect to the load region.

According to some embodiments of the present invention, the at least two preceding-stage power supply regions and/or the at least two post-stage power supply regions may also be distributed in a centrosymmetric manner.

According to some embodiments of the present invention, the at least two preceding-stage power supply regions are distributed in an axisymmetric manner with respect to the load region. The at least two post-stage power supply regions are distributed in a centrosymmetric manner with respect to the load region.

According to some embodiments of the present invention, the at least two preceding-stage power supply regions are distributed in a centrosymmetric manner with respect to the load region. The at least two post-stage power supply regions are distributed in an axisymmetric manner with respect to the load region.

According to some embodiments of the present invention, the at least two preceding-stage power supply regions and/or the at least two post-stage power supply regions may be evenly arranged. Alternatively, said regions may be unevenly arranged.

In some embodiments of the present invention, the preceding-stage power modules in the at least two preceding-stage power supply regions may be electrically connected to the post-stage power modules in the at least two post-stage power supply regions by a first power delivery network, and the post-stage power modules in the at least two post-stage power supply regions may be electrically connected to the load in the load region by a second power delivery network.

Figure 5A:
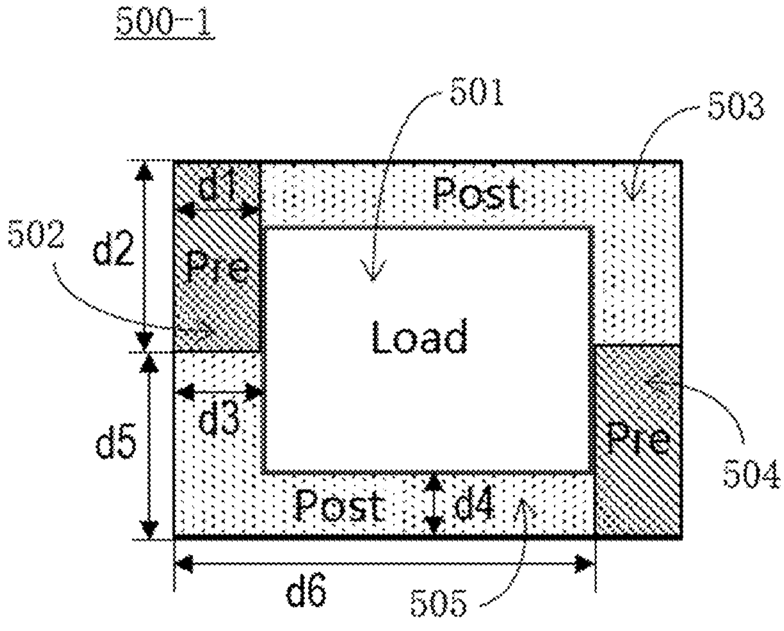
FIG. 5A is a schematic diagram showing a layout configuration of the two-stage power supply configuration in a distributed arrangement according to a first embodiment of the present invention.
Figure 5B:
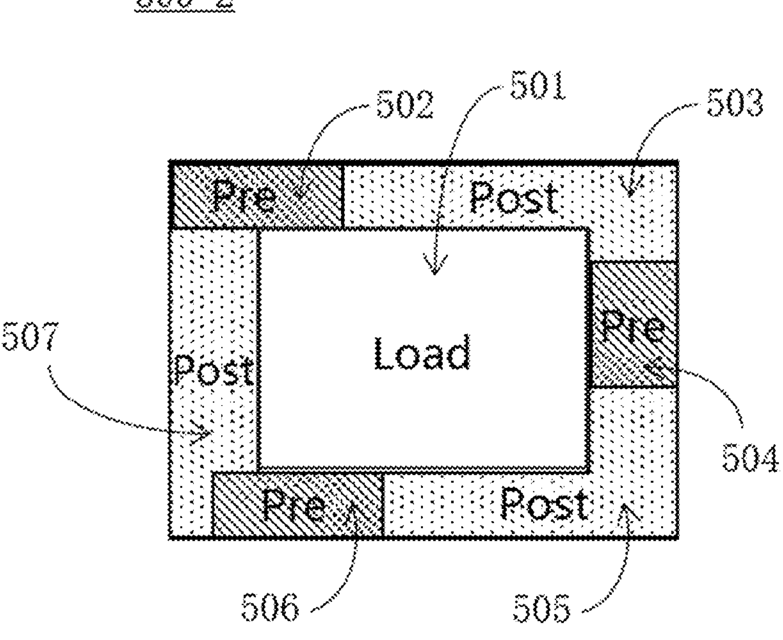
FIG. 5B is a schematic diagram showing a layout configuration of the two-stage power supply configuration in a distributed arrangement according to a second embodiment of the present invention.
Figure 5C:
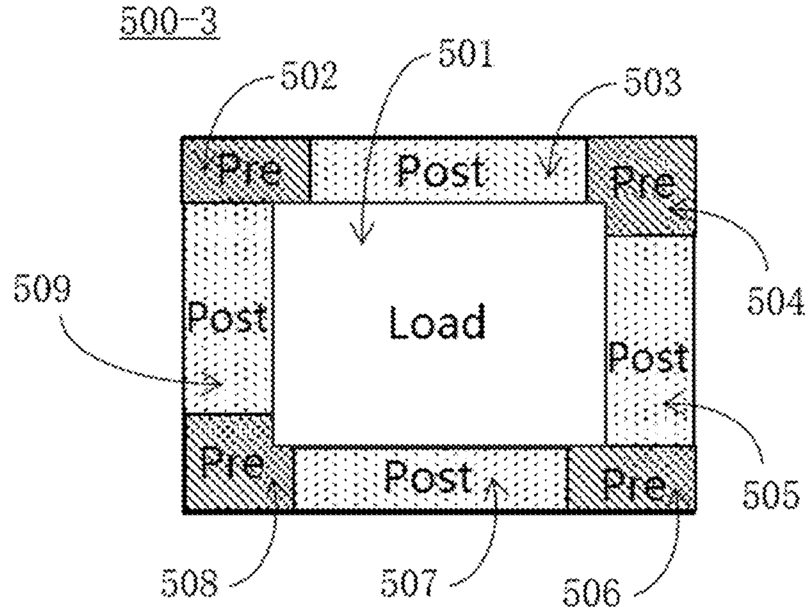
FIG. 5C is a schematic diagram showing the layout configuration of the two-stage power supply configuration in a distributed arrangement according to a third embodiment of the present invention.

FIGS. 5A to 5C show a plurality of embodiments of the two-stage power supply configurations in distributed arrangement according to the present invention. As shown in FIGS. 5A to 5C, a middle region is a load region 501 in which a load (such as a GPU) may be disposed, but the present invention is not limited thereto. Pre-stage power supply regions 502, 504, 506, 508 and post-stage power supply regions 503, 505, 507, 509 are disposed around the load region 501, and the preceding-stage power supply regions 502, 504, 506, 508 and the post-stage power supply regions 503, 505, 507, 509 are arranged in the staggered manner.

Specifically, the pre-stage power supply regions 502, 504, 506, 508 and the post-stage power supply regions 503, 505, 507, 509 are arranged alternately. For example, a head end of one of the pre-stage power supply regions 502, 504, 506, 508 adjoins a tail end of a previous one of the post-stage power supply regions 503, 505, 507, 509, while a tail end of the one of the pre-stage power supply regions 502, 504, 506,

508 adjoins a head end of a next one of the post-stage power supply regions 503, 505, 507, 509. Further, one post-stage power supply region is disposed between any two adjacent pre-stage power supply regions, while one pre-stage power supply region is disposed between any two adjacent post-stage power supply regions. Moreover, all of the pre-stage power supply regions 502, 504, 506, 508 and the post-stage power supply regions 503, 505, 507, 509 may construct a closed loop region surrounding the outer circumference of the load region 501.

For example, referring to the example in FIG. 5A, the head end of the pre-stage power supply region 502 adjoins the tail end of the previous post-stage power supply region 503, while the tail end of the pre-stage power supply region 502 adjoins the head end of the next post-stage power supply region 505. Further, one post-stage power supply region 503 or 505 is disposed between two adjacent pre-stage power supply regions 502 and 504, while one pre-stage power supply region 502 or 504 is disposed between two adjacent post-stage power supply regions 503 and 505. Moreover, the pre-stage power supply regions 502, 504, and the post-stage power supply regions 503, 505, construct a closed loop region surrounding the outer circumference of the load region 501.

It is to be noted that the number of the pre-stage power supply regions and the post-stage power supply regions are not limited to two as shown in FIG. 5A, and may include three (as shown in FIG. 5B), four (as shown in FIG. 5C), or more.

Here, each of the preceding-stage power supply regions includes at least one preceding-stage power module, each of the post-stage power supply regions includes at least one post-stage power module, and the preceding-stage power modules and the post-stage power modules are cascaded to supply power to the load in the load region.

FIG. 5A shows a layout configuration 500-1 of the two preceding-stage power supply regions 502 and 504, and the two post-stage power supply regions 503 and 505 according to the first embodiment. In the embodiment, the two preceding-stage power supply regions 502 and 504 and the two post-stage power supply regions 503 and 505 are evenly distributed around the load region 501. That is, the areas of two preceding-stage power supply regions 502 and 504 are substantially equal, and the areas of two post-stage power supply regions 503 and 505 are substantially equal. For example, when the two preceding-stage power supply regions are rectangular, and a width d1 of the preceding-stage power supply region 502 is substantially equal to that of the preceding-stage power supply region 504, the areas of two preceding-stage power supply regions being substantially equal means that a length d2 of the preceding-stage power supply region 502 is substantially equal to that of the preceding-stage power supply regions 504. Here, the term "equal" isn't absolute, and some conditions e.g. engineering errors are excluded. As shown in FIG. 5A, the two post-stage power supply regions are L-shaped regions. When the widths d3 and d4 of two regions are substantially equal and the lengths d5 and d6 of two regions are substantially equal, the areas of the two post-stage power supply regions are substantially equal. Of course, the preceding-stage power supply regions and the post-stage power supply regions may be in other shapes. In addition, it is to be understood that the two preceding-stage power supply regions 502 and 504 and the two post-stage power supply regions 503 and 505 may be unevenly arranged according to other embodiments.

Again, in a layout configuration 500-2 as shown in FIG. 5B and a layout configuration 500-3 as shown in FIG. 5C, the preceding-stage power supply regions and the post-stage power supply regions are evenly distributed around the load region. According to other embodiments, the preceding-stage power supply regions and/or the post-stage power supply regions may be arranged unevenly.

According to some embodiments of the present invention, a length of at least one of the post-stage power supply regions is greater than or equal to that of at least one of the preceding-stage power supply regions. For example, according to the embodiment as shown in FIG. 5B, a length of the post-stage power supply region 507 is greater than a length of the preceding-stage power supply region 502. According to the embodiment as shown in FIG. 5C, a length of the post-stage power supply region 509 is greater than a length of the preceding-stage power supply region 502.

In the layout configuration 500-1 as shown in FIG. 5A, the layout configuration 500-2 as shown in FIG. 5B, and the layout configuration 500-3 as shown in FIG. 5C, one or more preceding-stage power modules or post-stage power modules may be placed in each of the power supply regions, but the present invention is not limited thereto. According to some embodiments of the present invention, there may be a plurality of preceding-stage power modules in each of the preceding-stage power supply regions, and there may be a plurality of post-stage power modules in each of the post-stage power supply regions. Preferably, the preceding-stage power modules are evenly distributed with a first gap between two adjacent pre-stage power modules, and the post-stage power modules are evenly distributed with a second gap between two adjacent post-stage power modules. That is, the distance between any two of the adjacent preceding-stage power modules, that is, the first gap is substantially equal. The distance between any two of the adjacent post-stage power modules, that is, the second gap is substantially equal. According to some embodiments of the present invention, the first gap is, for example, less than one fifth of a length of one preceding-stage power module. The second gap may be, for example, less than one fifth of a length of one post-stage power module. The length of the preceding-stage power module is greater than or equal to a width thereof, and the length of the post-stage power module is greater than or equal to a width thereof. Preferably, the plurality of preceding-stage power modules are substantially equal in length, and the plurality of post-stage power supply modules are substantially equal in length. Of course, it is to be understood that the first gap and the second gap are not limited thereto, a plurality of preceding-stage power modules may be different in length, and a plurality of post-stage power modules may be different in length.

Under the same input and output conditions, when the number of the preceding-stage power modules and the number of the post-stage power modules remain unchanged, the more the number of the preceding-stage power supply regions and the post-stage power supply regions arranged in the staggered manner are, the smaller the current fluctuation on the delivery path is. As a result, the peak value of the intermediate bus current gets smaller, the lower the RMS current of the bus gets smaller, so the loss over the delivery path gets lower.

Figure 6:
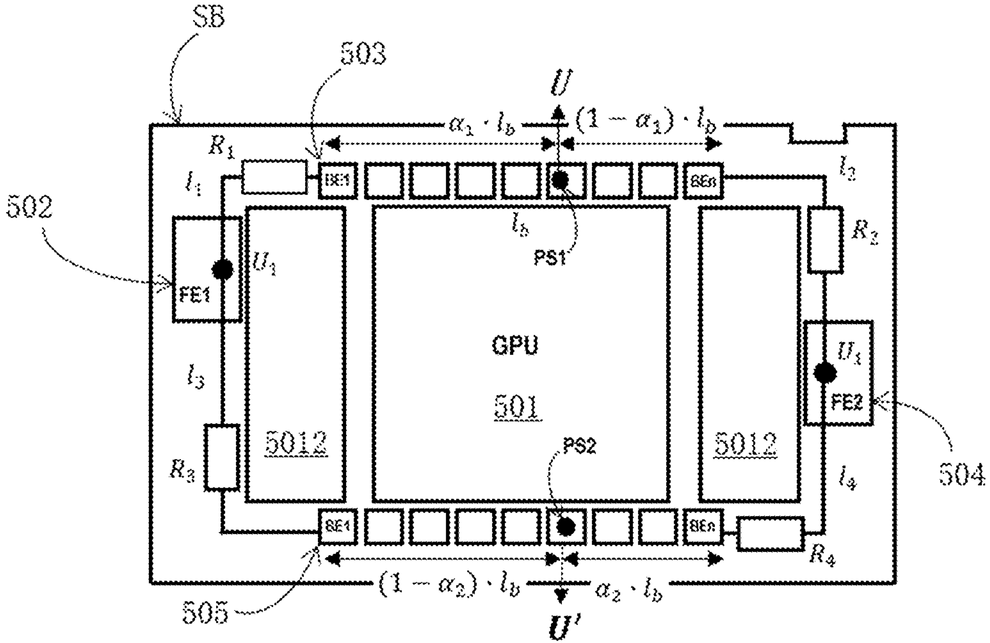
FIG. 6 shows a specific layout configuration.

Specifically, the layout configuration 500-1 as shown in FIG. 5A is taken as an example to analyze the current distribution. In the layout configuration as shown in FIG. 5A, each of the two preceding-stage power supply regions 502 and 504 includes one preceding-stage power module, and the two post-stage power supply regions 503 and 505 include the same number of post-stage power modules. The specific layout configuration is shown in FIG. 6. As shown in FIG. 6, the load region 501 in which the load, e.g. GPU is placed, is rectangular. Pre-stage power modules FE1 and FE2 in the two preceding-stage power supply regions 502 and 504 are respectively positioned on the left and right sides of the load, and post-stage power modules BE1, . . . , BEn in the two post-stage power supply regions 503 and 505 are respectively positioned on the upper and lower sides of the load. In addition, two rectangular regions 5012 are disposed between the load region 501 and the preceding-stage power supply regions 502 and 504, which are generally used to accommodate a GPU socket for external communication.

Here, for the specific layout configuration as shown in FIG. 6, the preceding-stage power supply regions and the post-stage power supply regions may be divided by two region division methods. For example, with the first region division method, the regions corresponding to orthographic projections of the preceding-stage power modules FE1 and FE2 on a carrier SB are the two preceding-stage power supply regions 502 and 504, which are positioned on the opposite sides of the load region 501, such as the left and right sides in FIG. 6. The regions between the preceding-stage power modules FE1 and FE2 are two post-stage power supply regions 503 and 505. In this way, each of the post-stage power supply region includes the regions corresponding to projections of the post-stage power modules BE1, . . . , BEn and the regions between the preceding and post-stage power modules. The regions between the preceding and post-stage power modules may include some other components, such as at least a portion of the power delivery network connecting the preceding and post-stage power modules. With the second region division method, the regions corresponding to the orthographic projections of the post-stage power modules BE1, . . . , BEn on the carrier SB are the two post-stage power supply regions 503 and 505, which are respectively positioned on opposite sides of the load region 501, such as the upper and lower sides in FIG. 6. In this way, the gap between the two adjacent post-stage power modules on the upper side are also positioned in the post-stage power supply region 503, and the gap between the two adjacent post-stage power modules on the lower side are also positioned in the post-stage power supply region 505. The preceding-stage power supply region 502 is from the post-stage power module BE1 on the upper side of the load, across the region on the left side of the load, and to the post-stage power module BE1 on the lower side of the load. And the preceding-stage power supply region 504 is from the post-stage power module BEn on the upper side of the load, across the region on the right side of the load, and to the lower post-stage power module BEn on the lower side of the load. In this way, each of the preceding-stage power supply regions includes the regions corresponding to the projections of the preceding-stage power module FE1 or FE2, and the regions between the preceding and post-stage power modules. The regions between the preceding and post-stage power modules may include some other components, such as at least a portion of the power delivery network connecting the preceding and post-stage power modules. However, it is to be understood that, the two preceding-stage power supply regions 502 and 504 and the two post-stage power supply regions 503 and 505 are always disposed around the load region 501 in the staggered manner. In addition, since the number of the preceding-stage power modules is same in different preceding-stage power supply regions, and the number of the post-stage power modules is same in different post-stage power supply regions, there is always a case in which the preceding-stage power supply regions 502 and 504 are evenly distributed around the load region 501, and the post-stage power supply regions 503 and 505 are evenly distributed around the load region 501.

The layout configuration as shown in FIG. 6 is further analyzed by use of the second region division method.

Figure 7:
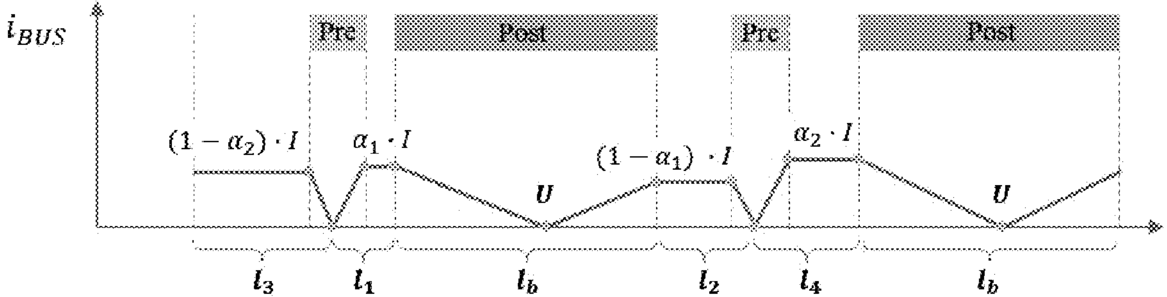
FIG. 7 is a waveform diagram of a current of the bus between a preceding-stage power module and a post-stage power module in the specific layout configuration as shown in FIG. 6.

As shown in FIG. 6, a distance from the preceding-stage power module FE1 to the post-stage power modules BE1 on the upper side of the load is defined as $l_1$, and a distance from the preceding-stage power module FE1 to the post-stage power module BE1 on the lower side of the load is defined as $l_3$. An impedance of the delivery path from the preceding-stage power module FE1 to the post-stage power module BE1 on the upper side of the load is defined as $R_1$, and an impedance of the delivery path from the preceding-stage power module FE1 to the post-stage power module BE1 on the lower side of the load is defined as R3. A distance from the preceding-stage power module FE2 to the upper and lower post-stage power module BEn on the upper side of the load is defined as 12, and a distance from the preceding-stage power module FE2 to the post-stage power module BEn on the lower side of the load is defined as $l_4$. An impedance of the delivery path from the preceding-stage power module FE2 to the post-stage power module BEn on the upper side of the load is defined as $R_2$, and an impedance of the delivery path from the preceding-stage power module FE2 to the post-stage power module BEn on the lower side of the load is defined as $R_4$. A length of the preceding-stage power supply region is defined as $l_0$, and $l_0=l_1+l_3=l_2+l_4$. In each of the post-stage power supply region, the post-stage power modules BE1, . . . , BEn are closely arranged, so the distance therebetween is negligible. A length of the post-stage power supply region is defined as $l_b$, which is the distance from the post-stage power module BE1 to the post-stage power module BEn in the same post-stage power supply region. And an impedance of the delivery path from the post-stage power module BE1 to the post-stage power module Ben in the same post-stage power supply region is defined as $R_b$. A total length of the preceding-stage power supply region and the post-stage power supply region is defined as L which is the perimeter around the load region, and $L=2(l_0 \pm l_b)$. And an impedance of the delivery path around the load region is defined as R. It is assumed that the resistance per unit length of the delivery path is constant, then $R=2(R_0+R_b)$. An output voltage of the preceding-stage power module is defined as U1. A minimum input voltage of the post-stage power modules on the upper side of the load is U, and a position corresponding to the minimum input voltage U is defined as PS1. A minimum input voltage of the post-stage power modules on the lower side of the load is U', and a position corresponding to the minimum input voltage U' is defined as PS2. A distance from the post-stage power module BE1 on the upper side of the load to the position PS1 is defined as $\alpha_1 \cdot l_b$, and a distance from the post-stage power module BEn on the lower side of the load to the position PS2 is defined as $\alpha_2 \cdot l_b$. An average output current of the preceding-stage power modules is defined as I, which is also the total input current of each of the post-stage power supply regions. FIG. 7 shows a current waveform on bus PDN between the preceding-stage power modules and the post-stage power modules in the layout configuration.

The specific calculation method of the RMS value corresponding to the current in FIG. 7 is shown in the following formula:

$$\begin{cases} I_{rms} = \sqrt{\begin{aligned} &(\alpha_1 I)^2 \cdot \frac{l_1}{L} + \frac{\int_0^{\alpha_1 \cdot l_b} \left(\frac{I}{l_b} \cdot x\right)^2 dx + \int_0^{(1-\alpha_1) \cdot l_b} \left(\frac{I}{l_b} \cdot x\right)^2 dx}{L} + (I - \alpha_1 I)^2 \cdot \frac{l_2}{L} + \\ &(\alpha_2 I)^2 \cdot \frac{l_4}{L} + \frac{\int_0^{\alpha_2 \cdot l_b} \left(\frac{I}{l_b} \cdot x\right)^2 dx + \int_0^{(1-\alpha_2) \cdot l_b} \left(\frac{I}{l_b} \cdot x\right)^2 dx}{L} + (I - \alpha_2 I)^2 \cdot \frac{l_3}{L} \end{aligned}} \\ U_1 = U + \frac{1}{2} \cdot I \cdot l_b \cdot \alpha_1^2 + \alpha_1 \cdot I \cdot l_1 \\ U_1 = U + \frac{1}{2} \cdot I \cdot l_b \cdot (1-\alpha_1)^2 + (1-\alpha_1) \cdot I \cdot l_2 \\ U_1 = U' + \frac{1}{2} \cdot I \cdot l_b \cdot \alpha_2^2 + \alpha_2 \cdot I \cdot l_3 \\ U_1 = U' + \frac{1}{2} \cdot I \cdot l_b \cdot (1-\alpha_2)^2 + (1-\alpha_2) \cdot I \cdot l_4 \end{cases} \tag{1}$$

where $\alpha_1 = \frac{1}{2} \cdot \frac{l_b + 2l_2}{l_b + l_1 + l_2}$, $\alpha_2 = \frac{1}{2} \cdot \frac{l_b + 2l_4}{l_b + l_3 + l_4}$, then $$I_{rms}(l_b, l_1, l_2, l_3, l_4, I) = \sqrt{\frac{1}{L}\left[\frac{l_b^2 + 4l_b(l_1 + l_2)}{12(l_b + l_1 + l_2)} + \frac{l_1 l_2}{(l_b + l_1 + l_2)} + \frac{l_b^2 + 4l_b(l_3 + l_4)}{12(l_b + l_3 + l_4)} + \frac{l_3 l_4}{(l_b + l_3 + l_4)}\right]} \cdot I.$$

Accordingly, the loss over the bus PDN is:

$$P_{PDN} = \left[\frac{R_b^2 + 4R_b(R_1 + R_2)}{12(R_b + R_1 + R_2)} + \frac{R_1 R_2}{(R_b + R_1 + R_2)} + \frac{R_b^2 + 4R(R_3 + R_4)}{12(R_b + R_3 + R_4)} + \frac{R_3 R_4}{(R_b + R_3 + R_4)}\right] \cdot I^2 \tag{2}$$

Apparently, $l_1$, $l_2$, $l_3$ and $l_4$ vary with the position of the preceding-stage power module in the preceding-stage power supply region. When $l_1$, $l_2$, $l_3$ and $l_4$ vary, the bus current will change, and the output current RMS value of the preceding-stage power module will also change.

Figure 8A:
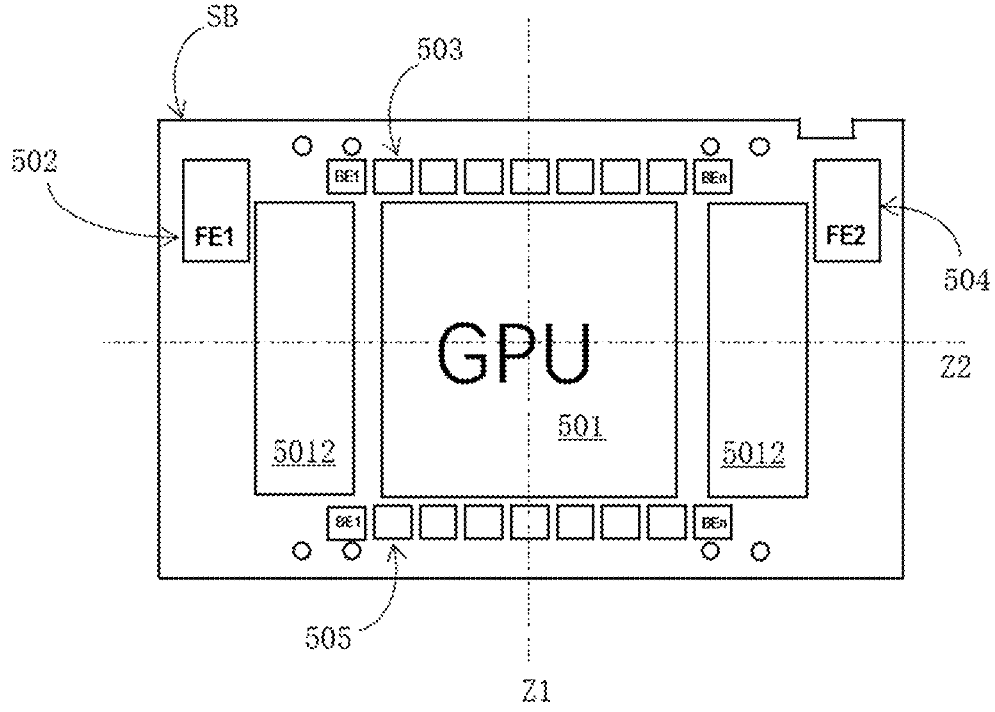
FIGS. 8A to 8C respectively show different layouts in which the preceding-stage power modules are distributed in an axisymmetric manner with respect to a load region according to the present invention.
Figure 8B:
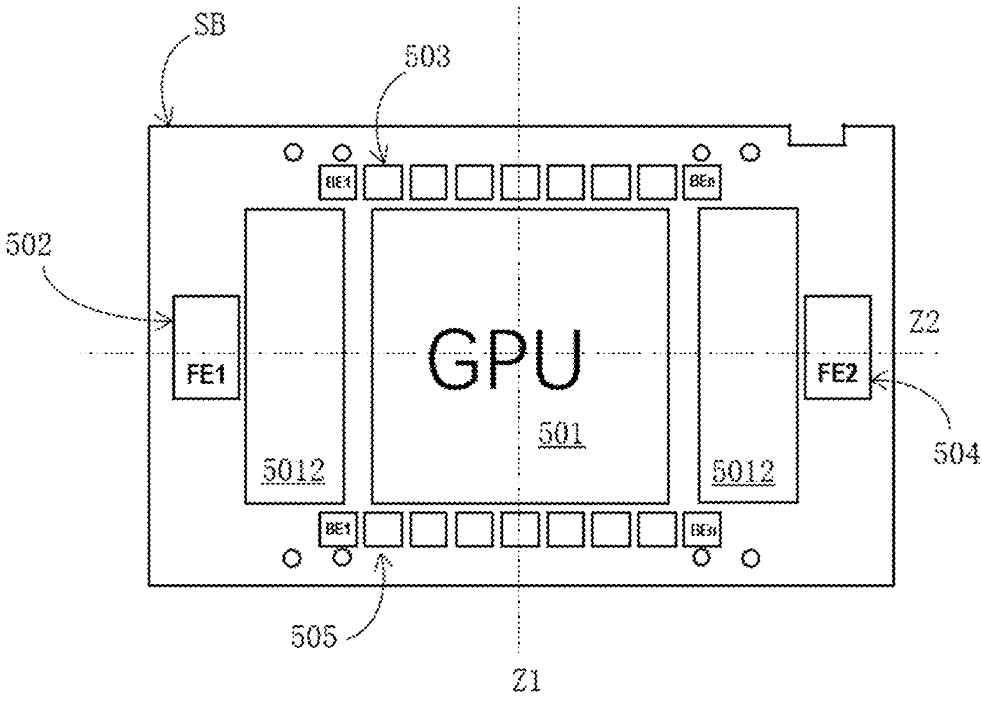
Figure 8C:
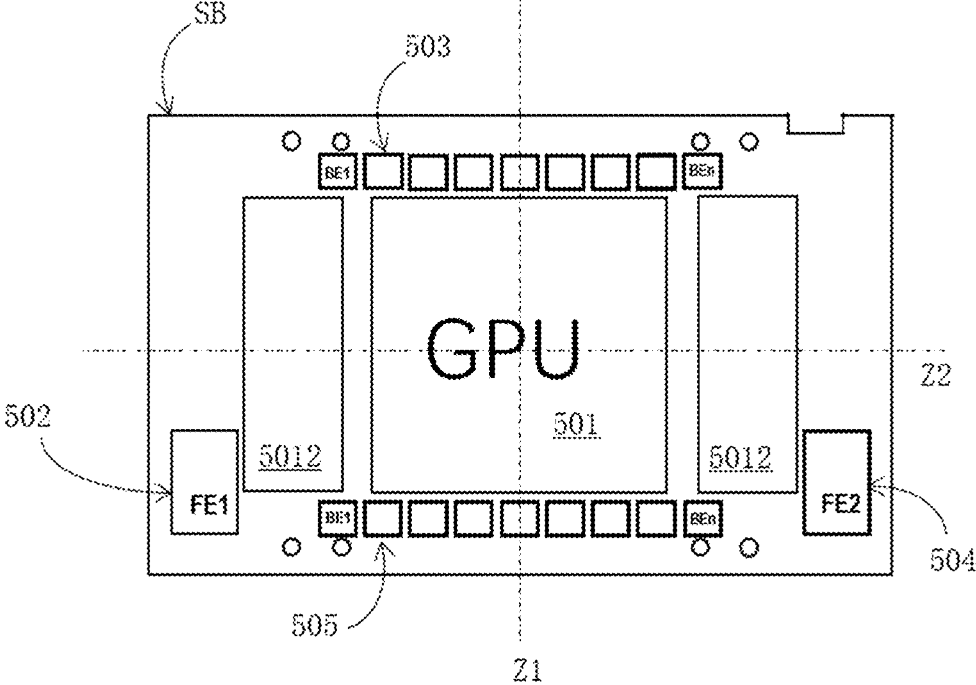

According to some embodiments of the present invention, as shown in FIGS. 8A to 8C, the post-stage power modules may be positioned at the upper and lower sides of the load region, and the preceding-stage power modules may be distributed in an axisymmetric manner with respect to the load region. Specifically, as shown in FIGS. 8A to 8C, the preceding-stage power modules are positioned at the left and right sides of the load region, the load region includes the centerline Z1, and the preceding-stage power modules are distributed in the axisymmetric manner with respect to the centerline Z1 of the load region. As a special case, the preceding-stage power modules may be distributed in the axisymmetric manner with respect to the projection regions of the post-stage power modules or the centerline of the post-stage power supply regions. As shown in FIGS. 8A to 8C, the power supply system includes the load region 501, the first preceding-stage power supply region 502, the second preceding-stage power supply region 504, the first post-stage power supply region 503 and the second post-stage power supply region 505. With the first region division method, the first preceding-stage power supply region 502 corresponds to the projection of the preceding-stage power module FE1 on the carrier SB and is positioned on the left side of the load region 501. The second preceding-stage power supply region 504 corresponds to the projection of the preceding-stage power module FE2 on the carrier SB and is positioned on the right side of the load region 501. The first post-stage power supply region 503 corresponds to a region from the preceding-stage power module FE1, across the upper left side of the load region 501, across the upper side of the load region 501, across the upper side of the load region 501, and to the preceding-stage power module FE2. The second post-stage power supply region 505 corresponds to a region from the preceding-stage power supply module FE1, across the lower left side of the load region 501, across the lower side of the load region 501, across the lower right side of the load region 501, and to the preceding-stage power supply module FE2. The first preceding-stage power supply region 502 and the second preceding-stage power supply region 504 are distributed in the axisymmetric manner with respect to the load region 501. Further, the first preceding-stage power supply region 502 and the second preceding-stage power supply region 504 are distributed in the axisymmetric manner with respect to the centerline Z1 of the load region 501. As shown in FIG. 8B, the first post-stage power supply region 503 and the second post-stage power supply region 505 are distributed in the axisymmetric manner with respect to the load region 501. Further, the first post-stage power supply region 503 and the second post-stage power supply region 505 are distributed in the axisymmetric manner with respect to a centerline Z2 of the load region 501. The two preceding-stage power supply regions 502 and 504 may be symmetrically positioned on upper portions of the left and right sides (as shown in FIG. 8A), middle portions of the left and right sides (as shown in FIG. 8B) or lower portions of the left and right sides (as shown in FIG. 8C).

With the second region division method, the first post-stage power supply region 503 corresponds to the projection of the post-stage power modules on the carrier SB and is positioned on the upper side of the load region 501. The second post-stage power supply region 505 corresponds to the projection of the post-stage power modules on the carrier SB and is positioned on the lower side of the load region 501. The first preceding-stage power supply region 502 corresponds to a region from the post-stage power module BE1 on the upper side of the load region 501, across the left side of the load region 501, and to the post-stage power module BE1 on the lower side of the load region 501. The second preceding-stage power supply region 504 corresponds to a region from the post-stage power module BEn on the upper side of the load region 501, across the right side of the load region 501, and to the post-stage power module BEn on the lower side of the load region 501. The first preceding-stage power supply region 502 and the second preceding-stage power supply region 504 are distributed in the axisymmetric manner with respect to the load region 501. Further, the first preceding-stage power supply region 502 and the second preceding-stage power supply region 504 are distributed in the axisymmetric manner with respect to the centerline Z1 of the load region 501. The first post-stage power supply region 503 and the second post-stage power supply region 505 are distributed in the axisymmetric manner with respect to the load region 501. Further, the first post-stage power supply region 503 and the second post-stage power supply region 505 are distributed in the axisymmetric manner with respect to the centerline Z2 of the load region 501. Therefore, there is always a division case in which the first preceding-stage power supply region 502 and the second preceding-stage power supply region 504 are distributed in the axisymmetric manner with respect to the load region 501, and the first post-stage power supply region 503 and the second post-stage power supply region 505 are distributed in the axisymmetric manner with respect to the load region 501.

With reference to FIG. 6 and the second region division method, in the three axisymmetric layout configurations as shown in FIGS. 8A to 8C, the relationship expressions $l_1=l_2$ and $l_3=l_4$ are satisfied whatever $l_1$ or $l_3$ ($l_2$ or $l_4$) equals to. The relationships are substituted into a general expression (1) of the RMS current. Then, $$I_{rms} = \sqrt{\frac{l_0/2 + l_b/6}{L}} \cdot I$$

is obtained, which is the bus current RMS value between the preceding and post-stage power module in the axisymmetric arrangement. The total length of the preceding and post-stage power supply regions has the relationship expression $L=2(l_0+l_b)$. The loss over the corresponding bus PDN is $$P_{PDN} = \left(\frac{R_0}{2} + \frac{R_b}{6}\right) \cdot I^2.$$

That is, if the two preceding-stage power modules are distributed in the axisymmetric manner with respect to the centerline of the post-stage power modules, or the post-stage power supply regions, or the load regions, the bus current RMS value between the preceding and post-stage power modules remains unchanged wherever the location of the preceding-stage power module in the preceding-stage power supply region are.

Figure 9A:
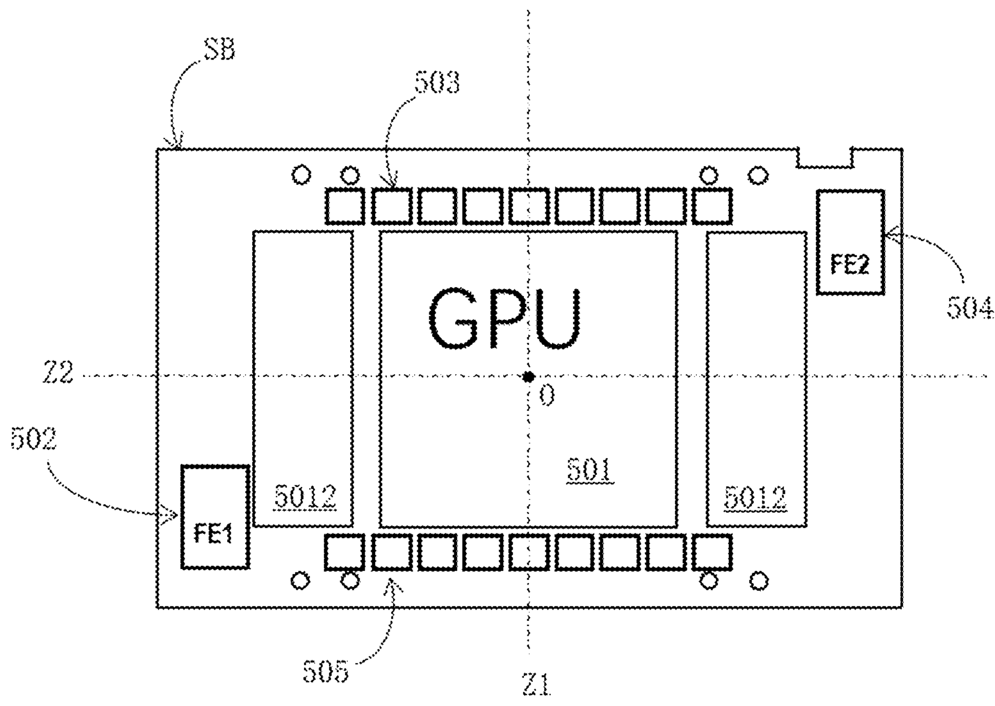
FIGS. 9A to 9B respectively show different layouts in which the preceding-stage power modules are distributed in a centrosymmetric manner with respect to the load region according to the present invention.
Figure 9B:
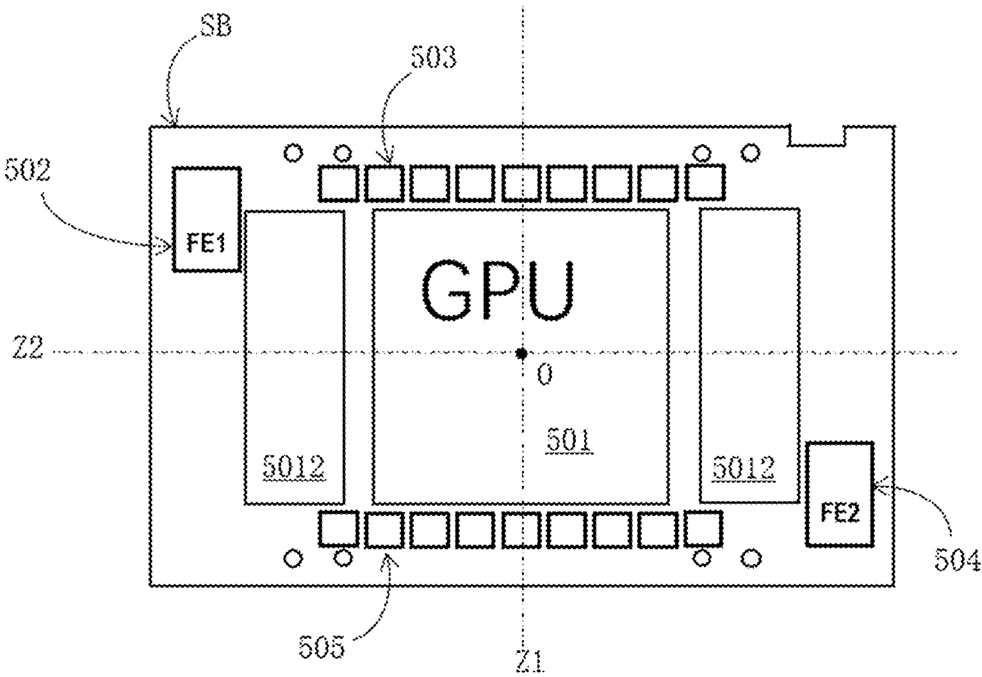

FIGS. 9A and 9B show another layout configuration according to the present invention. In the layout configuration, the preceding and post-stage power supply regions are also arranged in the staggered manner. Compared with the embodiments as shown in FIGS. 8A to 8C, in the layout configuration as shown in FIGS. 9A and 9B, the preceding-stage power modules are distributed in a centrosymmetric manner with respect to the load region, and the post-stage power modules or the post-stage power supply regions are distributed in the axisymmetric manner with respect to the load region. As shown in FIGS. 9A and 9B, the load region 501 includes the centerlines Z1 and Z2 and a central point O, the preceding-stage power modules FE1 and FE2 are distributed in the centrosymmetric manner with respect to the central point O of the load region 501, and the post-stage power modules or the post-stage power supply regions 503 and 505 are distributed in the axisymmetric manner with respect to the centerlines Z1 and/or Z2 of the load region 501. As a special case, the post-stage power modules or the post-stage power supply regions 503 and 505 are distributed in the axisymmetric manner with respect to the centerlines Z1 and Z2 of the load region 501. That is to say, the post-stage power modules or the post-stage power supply regions 503 and 505 are distributed in the axisymmetric manner with respect to the centerline Z1 and distributed in the axisymmetric manner with respect to the centerline Z2. With reference to FIG. 6 and the second region division method, in the layout configuration as shown in FIGS. 9A and 9B, $l_1=l_4$ and $l_2=l_3$, which are substituted into the general expression (1) of the current RMS value. Then, $$I_{rms} = \sqrt{\frac{l_b^2 + 4l_b l_0 + 12l_1(l_0 - l_1)}{3L^2}} \cdot I$$

is obtained, that is the bus current RMS value between the preceding and post-stage power modules in the centrosymmetric arrangement. The loss over the corresponding bus PDN is $$P_{PDN} = \left[\frac{R_b^2 + 4R_b R_0 + 12R_1(R_0 - R_1)}{3R}\right] \cdot I^2.$$

Figure 10:
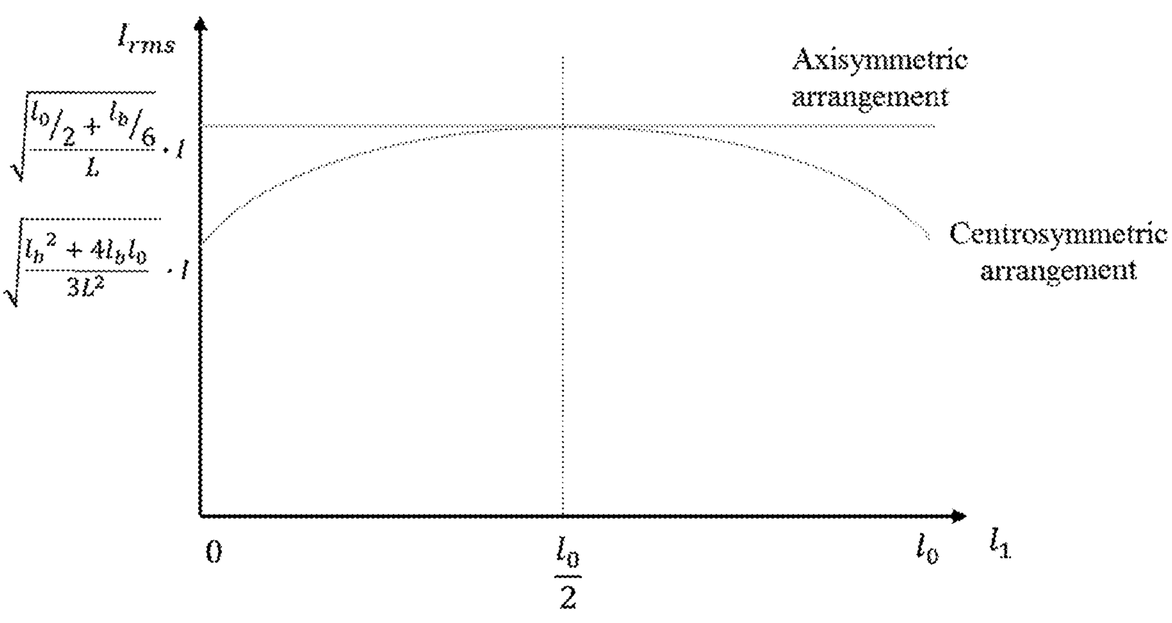
FIG. 10 shows a relationship in which effective values of the bus current is varied with a distance ii in the axisymmetric layout configuration and the centrosymmetric layout configuration according to the present invention.

FIG. 10 shows the bus current RMS value $I_{rms}$ changing with the distance $l_1$ in the layout configurations as shown in FIGS. 8A to 8C and FIGS. 9A and 9B.

It can be seen that in the staggered arrangement of the two preceding-stage power supply regions and the two post-stage power supply regions, if the length $l_b$ of one post-stage power supply region and the length $l_0$ of one preceding-stage power supply region are given, the bus current RMS value between the preceding stage and the post stage in the axisymmetric arrangement is a constant. The bus current RMS value between the preceding stage and the post stage in the centrosymmetric arrangement is less than or equal to the bus current RMS value between the preceding stage and the post stage in the axisymmetric arrangement, and the bus current RMS value in the centrosymmetric arrangement is related to the variable ii. Further, when $l_1=0$ or $l_1=l_0$, the bus current RMS value in the centrosymmetric arrangement has a minimum value which equals to $$\sqrt{\frac{l_b^2 + 4l_b l_0}{3L^2}} \cdot I.$$

And when $l_1=l_0/2$, the bus current RMS value in the centrosymmetric arrangement has a maximum value which equals to the maximum value equals to the bus current RMS value in the axisymmetric arrangement $$\sqrt{\frac{l_0/2 + l_b/6}{L}} \cdot I.$$

As shown in FIGS. 6 to 9B, only one preceding-stage power module is located in each preceding-stage power supply region. Actually, in the conditions that a plurality of preceding-stage power modules are located in each preceding-stage power supply region, the axisymmetric and the centrosymmetric layout configuration can still be met. That is to say, when two preceding-stage power supply regions and two post-stage power supply region are arranged in staggered way and the quantity of the preceding-stage power modules in each preceding-stage power supply regions is same, the bus current RMS value in the case of the preceding-stage power modules axisymmetric with respect to the load region is equal to or greater than the bus current RMS value in the case of the preceding-stage power modules centrosymmetric with respect to the center point of the load region.

Figure 2:
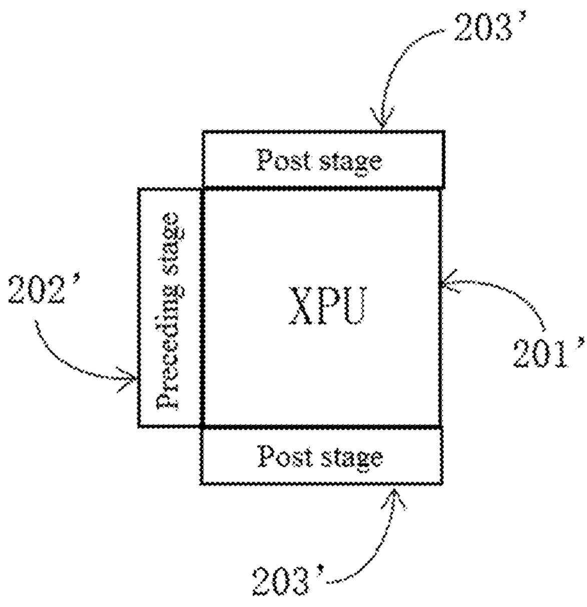
FIG. 2 is a schematic diagram showing a second layout configuration of a conventional two-stage power supply architecture.
Figure 3:
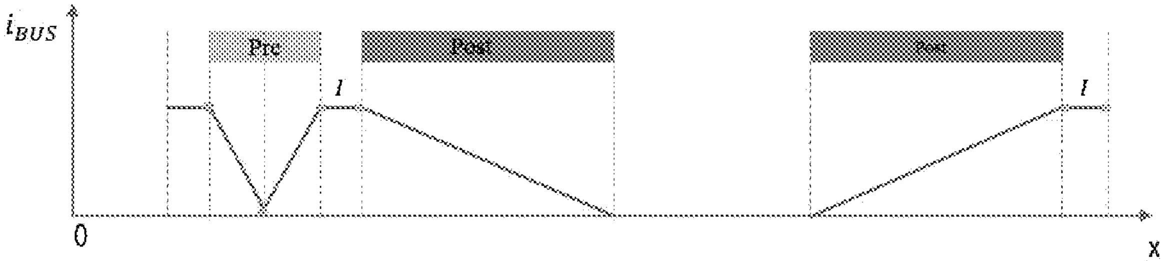
FIG. 3 is a schematic diagram showing typical current densities in the second layout configuration.
Figure 4:
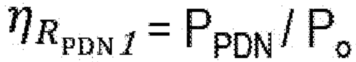
FIG. 4 shows a relationship between impedances and losses over the delivery path in the second layout configuration.
Figure 4:
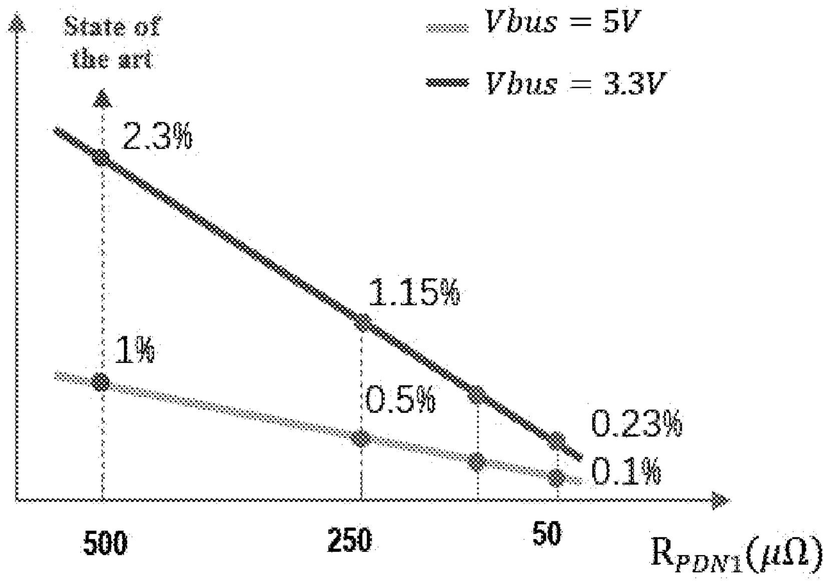
Figure 11:
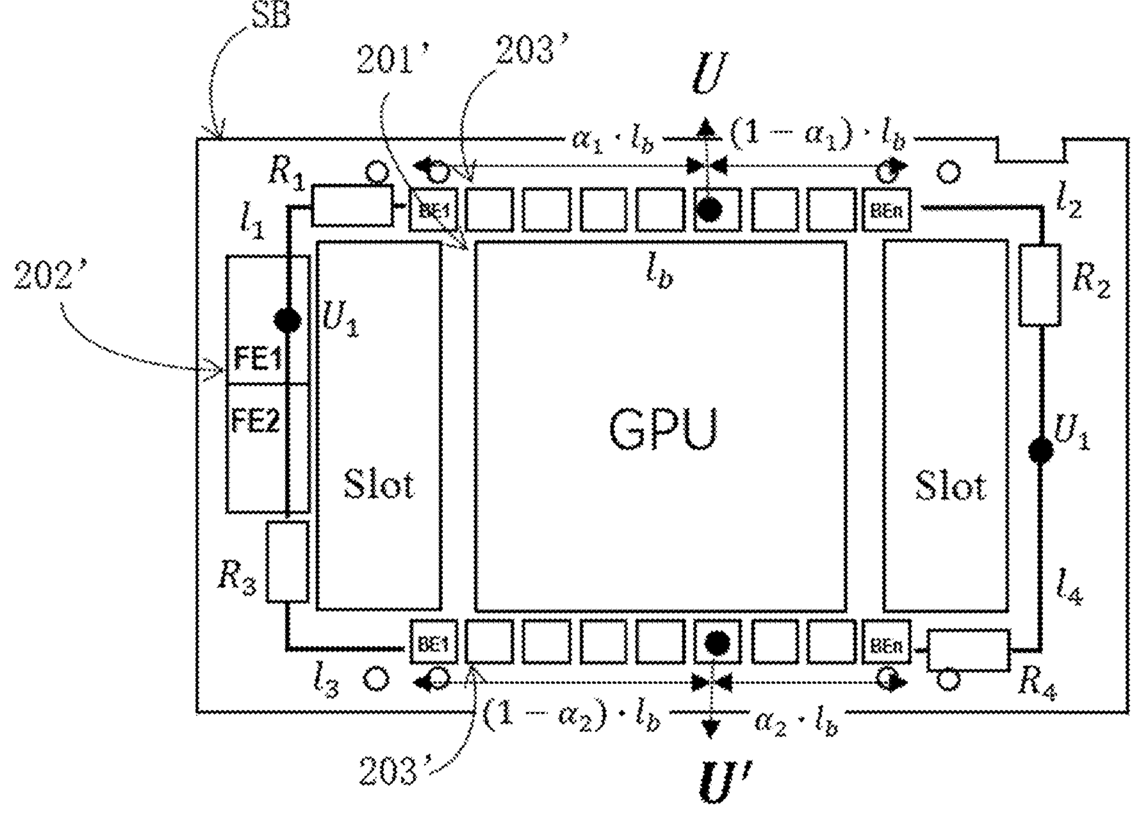
FIG. 11 shows a specific layout configuration of the conventional second layout configuration as shown in FIG. 2.

FIG. 2 shows a layout configuration with one centralized preceding-stage power supply region and one centralized post-stage power supply region. FIG. 11 shows the structure with centralized preceding-stage and post-stage power supply regions, and FIG. 12 shows a waveform diagram of the current on the bus PDN between the preceding-stage power modules and the post-stage power modules in the structure of FIG. 11 under the condition that the total numbers of the preceding-stage power modules and the post-stage power modules are the same as those in FIG. 6 respectively, and the same layout of the post-stage power supply as that in FIG. 6.

Figure 12:
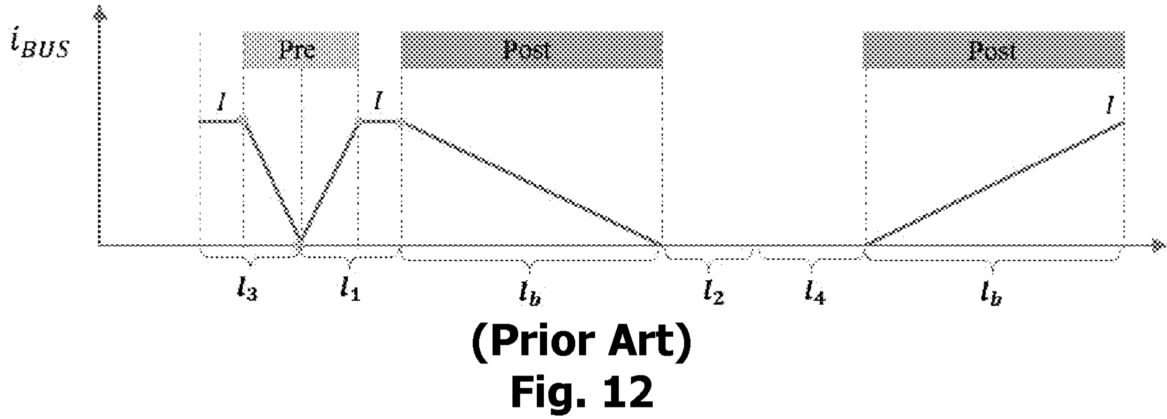
FIG. 12 is a waveform diagram of the bus current in the specific layout configuration as shown in FIG. 11.

As shown in FIG. 12, the peak value of the bus current of the two-stage power supply configuration in FIG. 11 is I while the peak value of the bus current of the power supply configuration in FIG. 6 is $$\alpha_1 \cdot I = \frac{1}{2}\frac{l_b + 2l_2}{l_b + l_1 + l_2} \cdot I.$$

Accordingly, the peak current of the existing two-stage power supply configuration in FIG. 11 is greater than that of the layout configuration of the present invention in FIG. 6. When there are more post-stage power modules and the length $l_b$ of the post-stage power supply region is greater than the length $l_1+l_2$ (or $l_3+l_4$) of the preceding-stage power supply region, the difference between the peak current of the existing configuration in FIG. 11 and that in FIG. 6 will become larger. In addition, compared FIG. 6 with FIG. 11, it is found that the current in FIG. 6 is distributed more evenly than the current in FIG. 11 so the current RMS value in FIG. 6 is lower than the current RMS value in FIG. 11. This conclusion also can be obtained through analysis on the current formula.

The bus current RMS value of the existing two-stage power supply configuration in FIG. 11 is $$I'_{rms} = \sqrt{\frac{2l_1 + \frac{2}{3}l_b}{L}} \cdot I.$$

When the length $l_b$ of the post-stage power supply region is greater than or equal to the length $l_o$ of the preceding-stage power supply region, the formula is shown as follows:

$$I'_{rms} = \sqrt{\frac{2l_1 + \frac{2}{3}l_b}{L}} \cdot I \geq \sqrt{\frac{l_0/2 + l_b/6}{L}} \cdot I \geq \sqrt{\frac{l_b^2 + 4l_b l_0 + 12l_1(l_0 - l_1)}{3L^2}} \cdot I = I_{rms}$$

The above formula means that the bus current RMS value of the two-stage power supply configuration in FIG. 11 is greater than the maximum of the bus current RMS value of the layout configuration in FIG. 6. Thus the layout of the present invention in which the preceding and post-stage power supply regions are staggered can effectively reduce the RMS value of the bus current between the preceding and post-stage power supply regions, thereby reducing the loss caused by the transfer impedance of the transmission line.

Certainly, when the length of the post-stage power supply region is greater than the length of the preceding-stage power supply region, the impedance $R_b$ of the post-stage power supply region is usually greater than the impedance $R_0$ of the preceding-stage power supply region. Therefore, the relationship between the power loss of the bus PDN in the existing two-stage power supply configuration and that in the layout configuration of the present invention in FIG. 6 is shown as follows:

$$P = \left(2R_1 + \frac{2R_b}{3}\right) \cdot I^2 \geq \left(\frac{R_0}{2} + \frac{R_b}{6}\right) \cdot I^2 \geq \left[\frac{R_b^2 + 4R_bR_0 + 12R_1(R_0 - R_1)}{3R}\right] \cdot I^2$$

Figure 13:
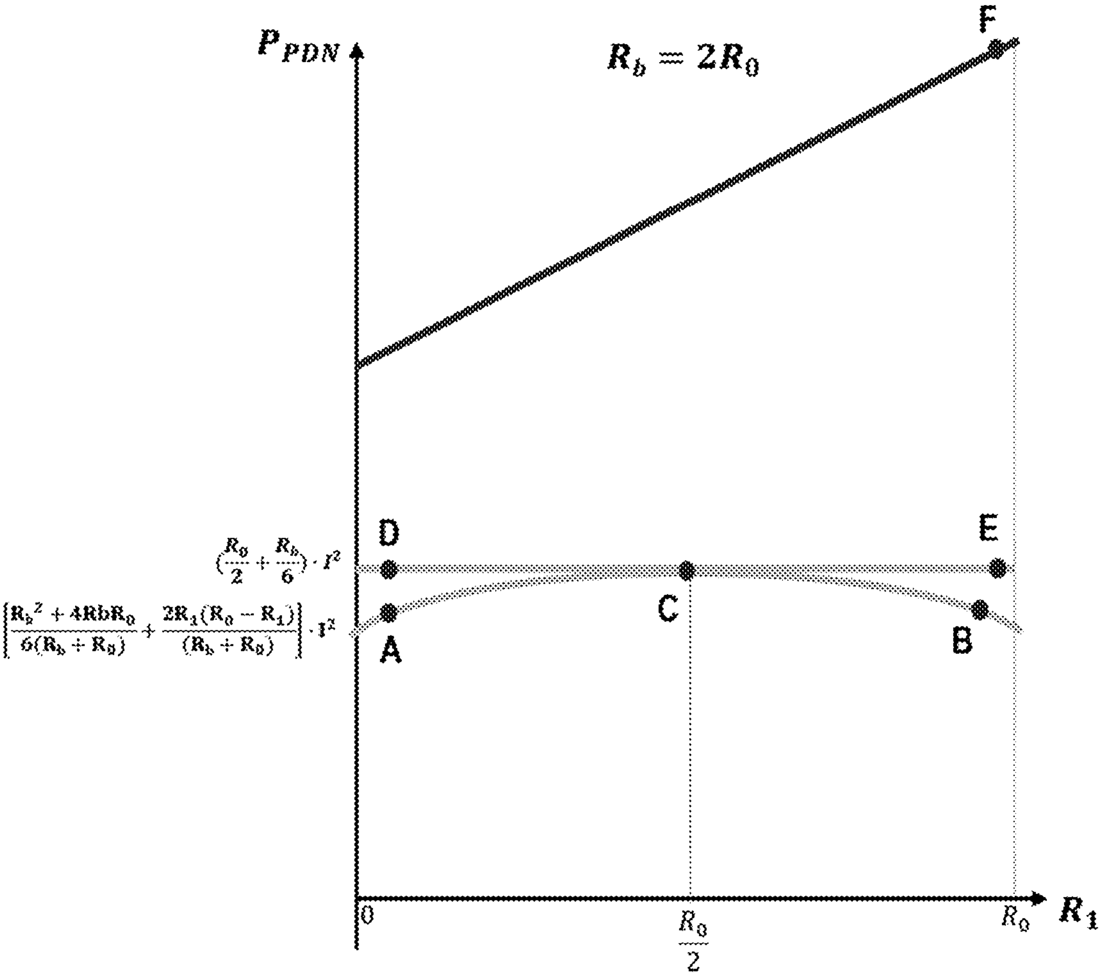
FIGS. 13 and 14 shows curves of the losses varied with $R_1$ in conditions of $R_b=2R_0$ and $R_b=R_0$, respectively.
Figure 14:
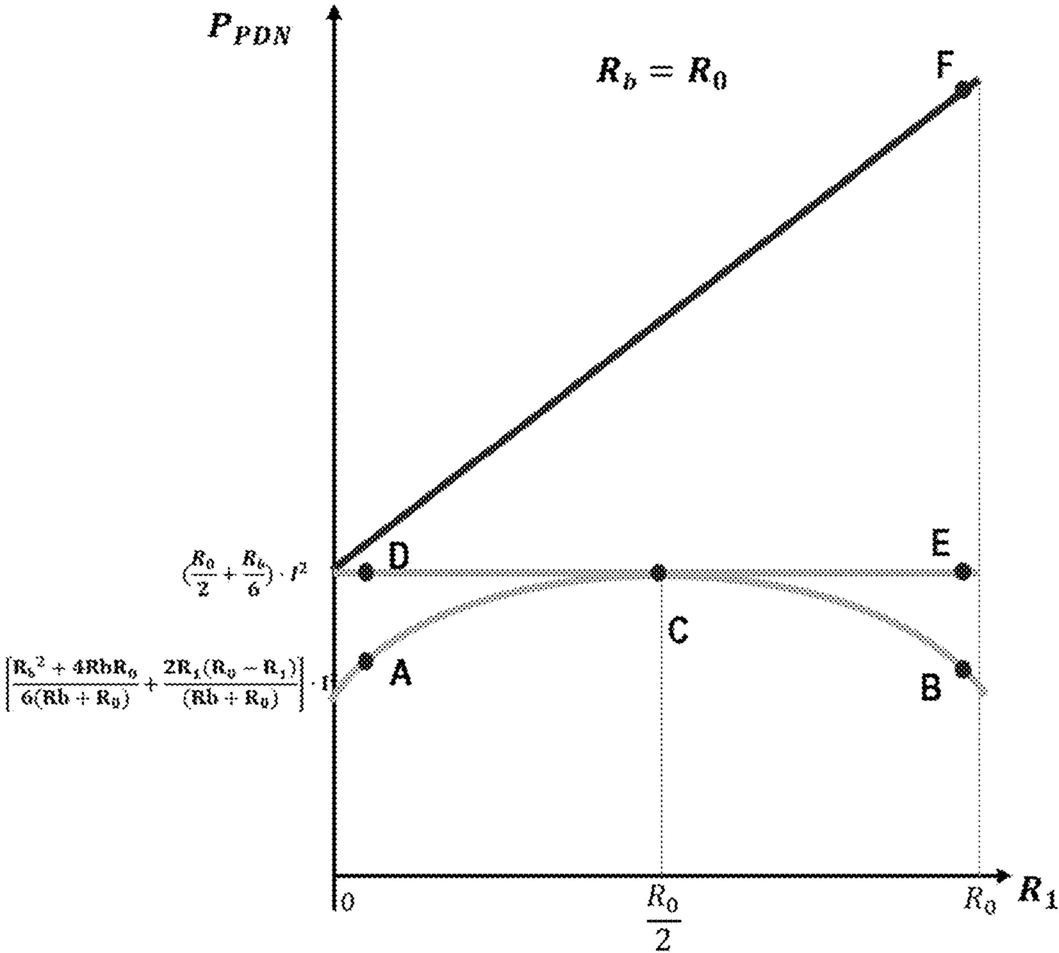

This expression shows that the power loss of the bus PDN decreases in the sequence of the existing two-stage power supply configuration, the axisymmetric arrangement in the distributed layout configuration in FIG. 6 and the centrosymmetric arrangement. FIG. 13 shows the power loss curve which varies with $R_1$ under the condition of $R_b=2R_0$. FIG. 14 shows the power loss curve which varies with $R_1$ under the condition of $R_b=R_0$.

As shown in FIGS. 13 and 14, the points A and B on the curve are respectively corresponding to the structures shown in FIGS. 9A and 9B, the points D, C and E are respectively corresponding to the structures shown in FIGS. 8A, 8B and 8C, and the point F are corresponding to the centralized structure in the existing two-stage power supply configuration shown in FIG. 11. Compared with the existing centralized structure, the layout that the preceding and post-stage power supply regions are in staggered way in the present invention can significantly reduce the power loss of the bus PDN.

Figure 15:
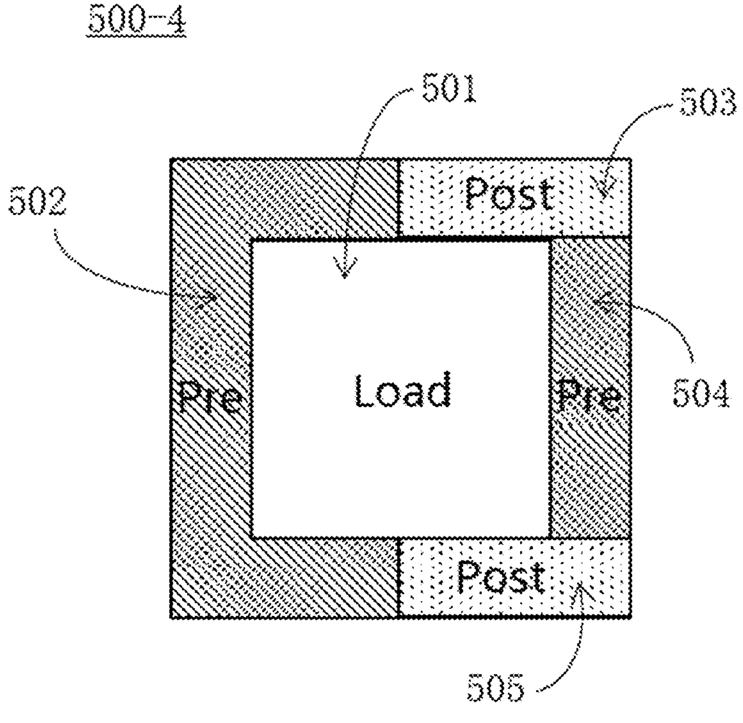
FIG. 15 shows a layout configuration in which two preceding-stage power supply regions are distributed unevenly according to the present invention.
Figure 16:
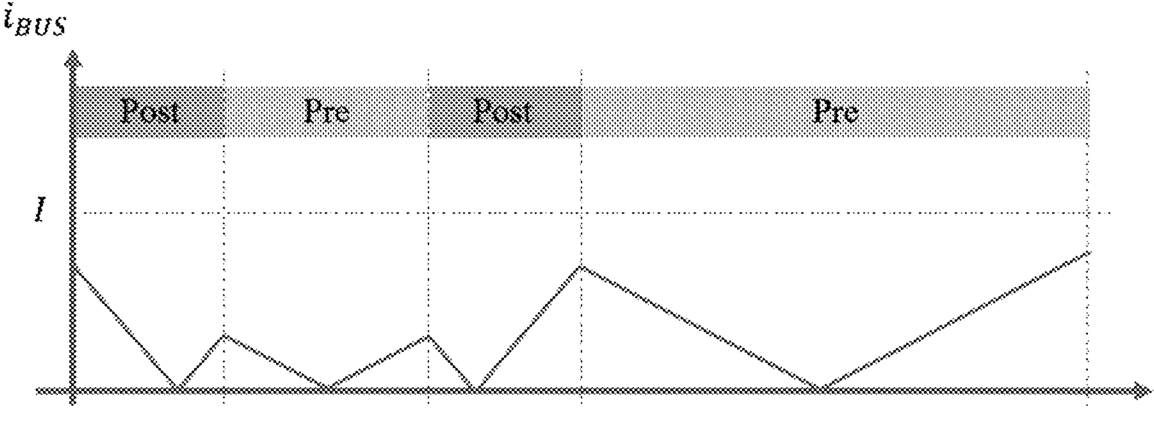
FIG. 16 is a diagram showing a distribution of the bus current corresponding to the unevenly distributed layout configuration as shown in FIG. 15.

The preceding and post-stage power supply regions which are arranged in staggered way are distributed evenly. Certainly, the preceding and/or post-stage power supply regions around the load region may be distributed unevenly. That is to say, the areas of the preceding-stage power supply regions are different, and/or the areas of the post-stage power supply regions are different. When there are more preceding-stage power supply regions and post-stage power supply regions, distributing unevenly among the preceding and/or post-stage power supply regions around the load region often occurs. FIG. 15 shows the unevenly distributed structure with two preceding-stage power supply regions 502 and 504 and two post-stage power supply regions 503 and 505. The area of the preceding-stage power supply region 502 is different from the area of the preceding-stage power supply region 504. In FIG. 15, the areas of the two post-stage power supply regions 503 and 505 are substantially the same, but the area of the preceding-stage power supply region 502 on the left side is far greater than that of the preceding-stage power supply region 504 on the right side. Compared with the preceding-stage power supply region 504 on the right side, more preceding-stage power modules can be placed in the preceding-stage power supply region 502 on the left side. Though the sizes of the preceding-stage power supply regions are different, the quantity of the power modules may be same in such two power supply regions. The bus current waveform corresponding to the structure in FIG. 15 is shown in FIG. 16. Generally, under the condition that the quantity of the preceding-stage power modules in all preceding-stage power supply regions is same and the quantity of the post-stage power modules in all post-stage power supply regions is same, while the sizes of such power supply regions are different, the more even the distribution is in the structure, the smaller the RMS value of bus current is in such structure. Correspondingly, the less the power loss over the bus PND between the preceding-stage power supply regions and the succeeding power supply regions is, thereby improving the efficient of the power supply.

Figure 17A:
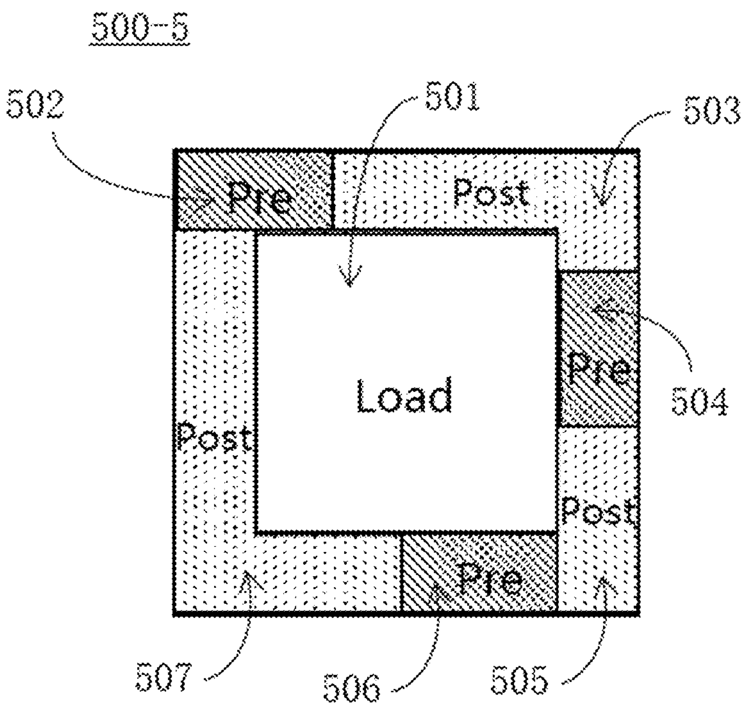
FIG. 17A is a schematic diagram showing a layout configuration in which three preceding-stage power supply regions and three post-stage power supply regions are arranged unevenly around a load region according to the present invention.
Figure 17B:
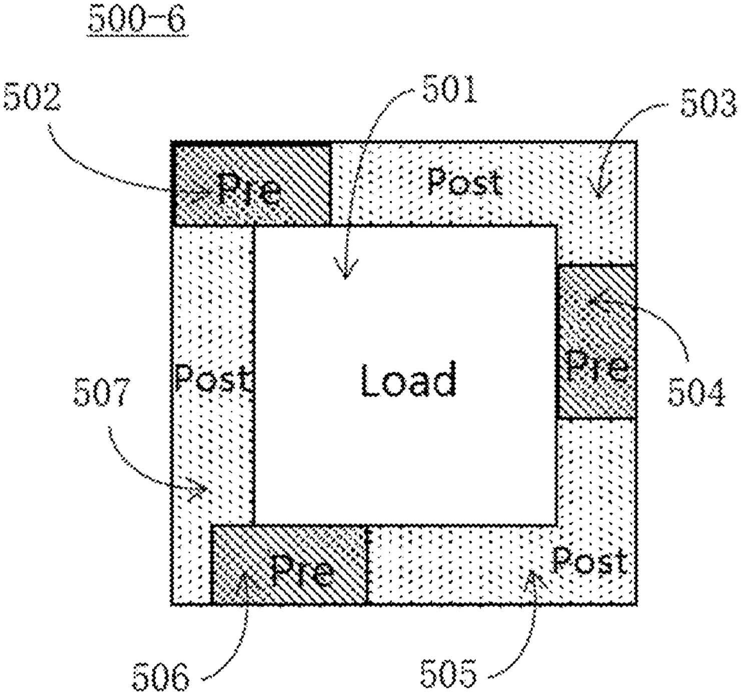
FIG. 17B is a schematic diagram showing a layout configuration in which three preceding-stage power supply regions and three post-stage power supply regions are arranged evenly around the load region according to the present invention.

FIGS. 17A and 17B show that three preceding-stage power supply regions and three post-stage power supply regions are disposed around the load region in staggered way. Here, FIG. 17A is taken as the example of unevenly distributed structure where the areas of three post-stage power supply regions 503, 505 and 507 are different. FIG. 17B is taken as the example of evenly distributed structure where the areas of three post-stage power supply regions 503, 505 and 507 are same, and the areas of three preceding-stage power supply regions 502, 504 and 506 are also same.

Figure 18A:
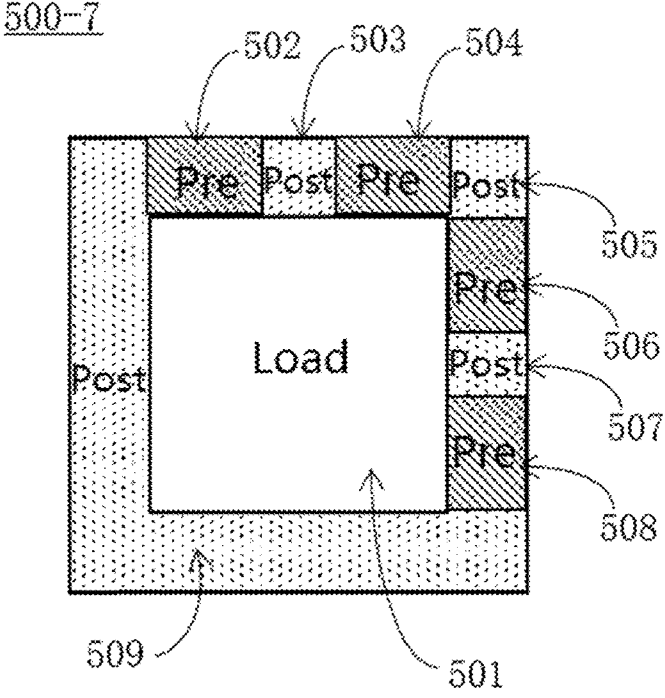
FIG. 18A is a schematic diagram showing a layout configuration in which four preceding-stage power supply regions and four post-stage power supply regions are arranged unevenly around the load region according to the present invention.
Figure 18B:
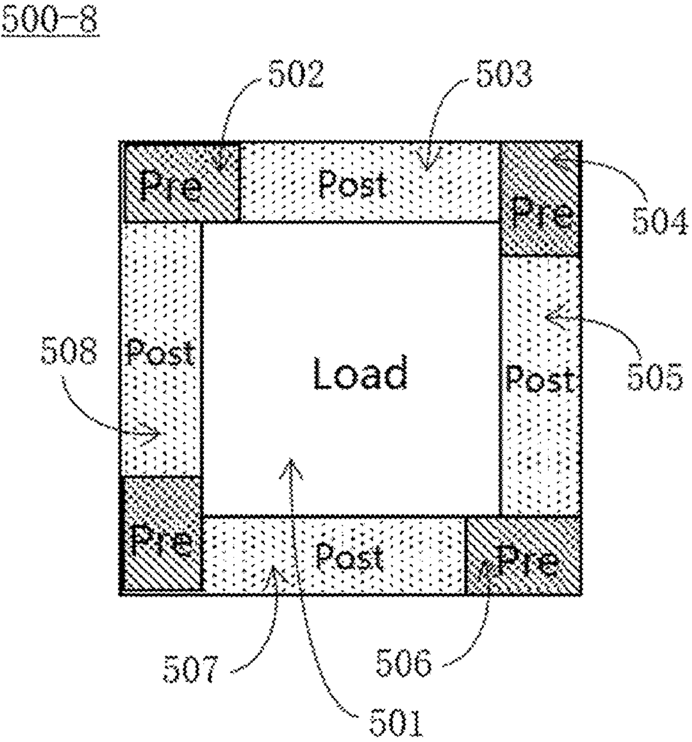
FIG. 18B is a schematic diagram showing a layout configuration in which four preceding-stage power supply regions and four post-stage power supply regions are arranged evenly around the load region according to the present invention.

FIGS. 18A to 18B show that four preceding-stage power supply regions and four post-stage power supply regions are disposed around the load region in staggered way. Here, FIG. 18A is taken as the example of unevenly distributed structure where the areas of four post-stage power supply regions 503, 505, 507 and 509 are different. FIG. 18B is taken as the example of evenly distributed structure where the areas of four post-stage power supply regions 503,505, 507 and 509 are same, and the areas of four preceding-stage power supply regions 502, 504, 506 and 508 are also same.

Such layout configuration can be expanded to n preceding-stage power supply regions and n post-stage power supply regions. Specifically, n preceding-stage power supply regions and n post-stage power supply regions are disposed around the load region in staggered way, and n≥2. Similarly, in the structure, the more even the distribution is, the smaller the RMS value of bus current is. Correspondingly, the less the power loss over the bus PND between the preceding-stage power supply regions and the succeeding power supply regions is, thereby improving the efficient of the power supply.

Figure 19:
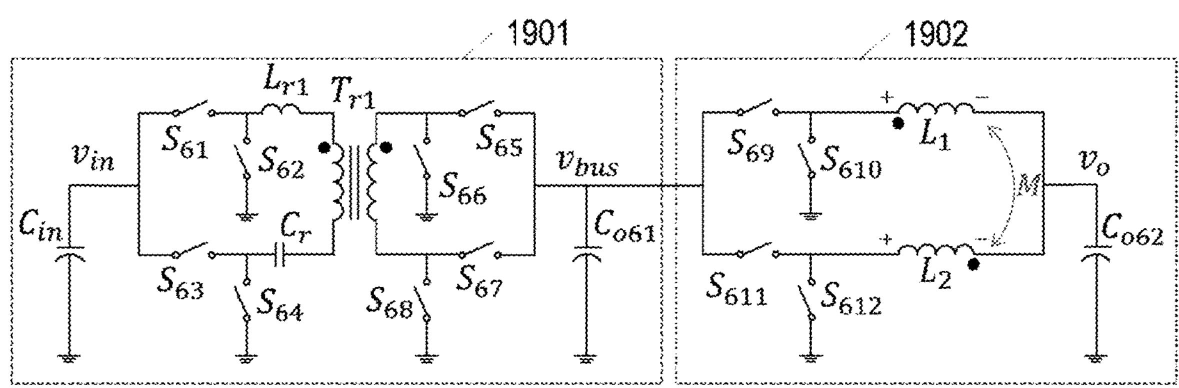
FIG. 19 is a schematic diagram showing a circuit structure according to a first embodiment of the power supply system of the present invention.

In the prevent invention, the above-mentioned preceding-stage power module may be a regulated circuit (such as a regulated LLC circuit) or an unregulated circuit (such as an unregulated LLC circuit), or may be an isolated circuit or a non-isolated circuit. The post-stage power module may be a non-isolated circuit or an isolated circuit. The combinations between the preceding-stage power module and the post-stage power module can be diversified. In some embodiments of the present invention, as shown in FIG. 19, the preceding-stage power module 1901 may be an isolated series resonant LLC circuit; and the post-stage power module 1902 may be a multi-phase parallel Buck circuit. The inductor of each phase of the Buck circuit may be reversed-coupled to each other. Certainly, the inductor of each phase of the multi-phase parallel Buck circuit may be positive-coupled to each other, or uncoupled.

Figure 20:
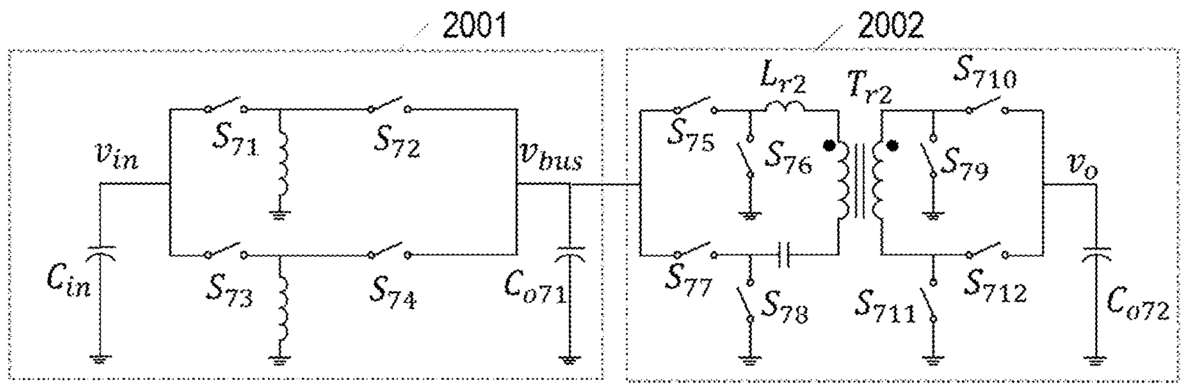
FIG. 20 is a schematic diagram showing a circuit structure according to a second embodiment of the power supply system of the present invention.

In some embodiments of the present invention, as shown in FIG. 20, the preceding-stage power module 2001 may be a Buck-Boost circuit; and the post-stage power module 2002 may be a resonant circuit, such as an LLC resonant circuit.

Figure 21:
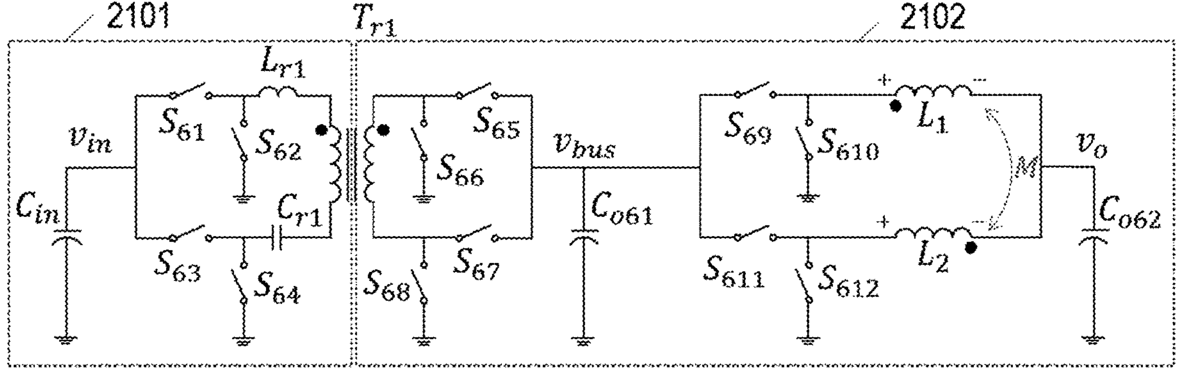
FIG. 21 is a schematic diagram showing a circuit structure according to a third embodiment of the power supply system of the present invention.
Figure 22:
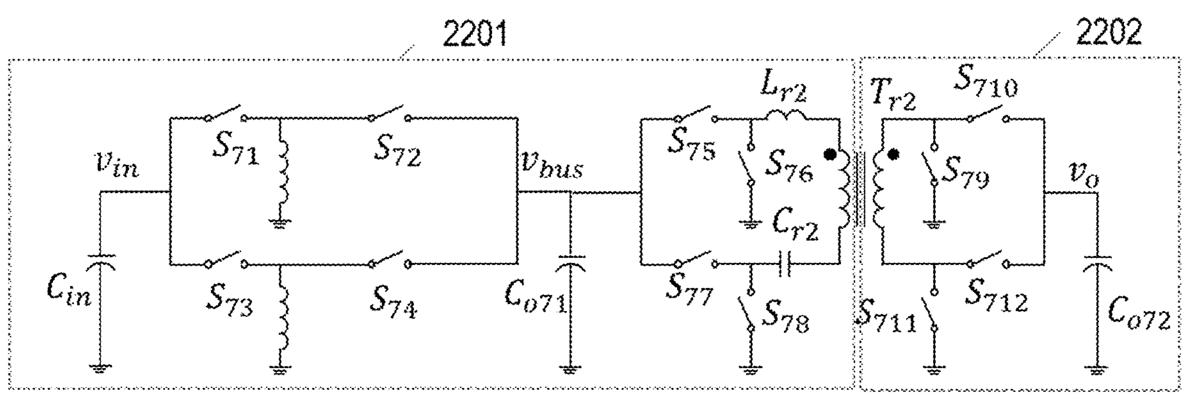
FIG. 22 is a schematic diagram showing a circuit structure according to a fourth embodiment of the power supply system of the present invention.

In some embodiments of the present invention, the preceding-stage power module or the post-stage power module may even contain one part of a whole conversion circuit. For example, in FIG. 21 or FIG. 22, a transformer is used as the boundary between the preceding-stage power module and the post-stage power module. The primary-side winding of transformer and the primary-side circuit connected with the primary-side winding are located in the preceding-stage power module; and the secondary-side winding of transformer and the secondary-side circuit connected with the secondary-side winding are located in the post-stage power module. As shown in FIG. 21, the preceding-stage power module 2101 only contains the primary-side winding of transformer and the primary-side part of the resonant circuit connected with the primary-side winding, while the post-stage power module 2102 contains the secondary-side winding of transformer, the secondary-side part of the resonant circuit connected with the secondary-side winding, and the multiphase parallel Buck circuit. As shown in FIG. 22, the preceding-stage power module 2201 contains a Buck-Boost circuit and the primary-side parts of a resonant circuit (such as LLC resonant circuit), while the post-stage power module 2202 contains the secondary-side part of the resonant circuit.

Figure 23:
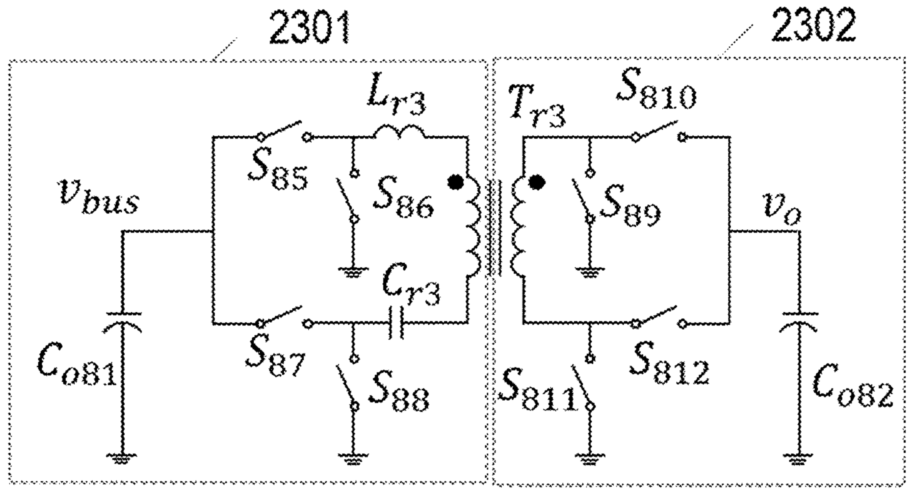
FIG. 23 is a schematic diagram showing a circuit structure according to a fifth embodiment of the power supply system of the present invention.
Figure 24:
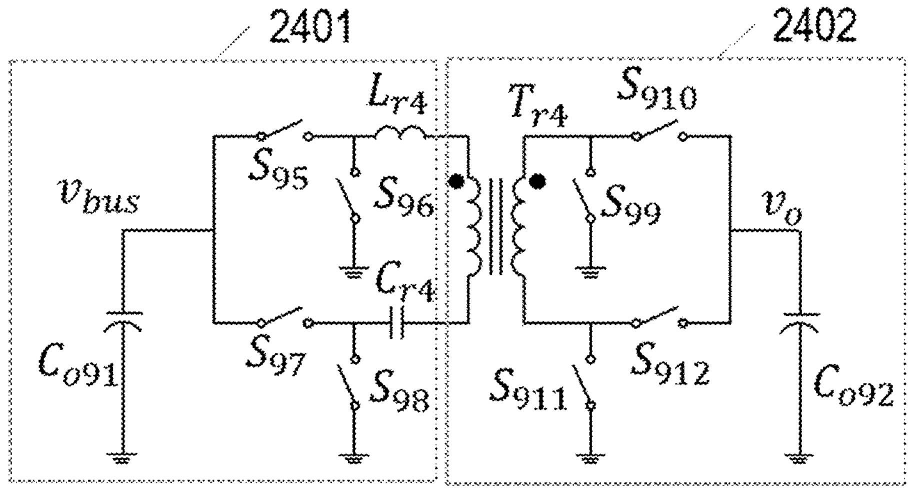
FIG. 24 is a schematic diagram showing a circuit structure according to a sixth embodiment of the power supply system of the present invention.

In some embodiments of the present invention, the preceding-stage power module can only contain the primary-side part of the resonant circuit while the post-stage power module can only contain the secondary-side part of the resonant circuit. As shown in FIG. 23, the transformer is used as the boundary between the preceding-stage power module and the post-stage power module. The primary-side part of the resonant circuit contains the primary-side winding of the transformer and the primary-side circuit connected with the primary-side winding. The primary-side part of the resonant circuit is located in the preceding-stage power module 2301. The secondary-side part of the resonant circuit contains the secondary-side winding of the transformer and the secondary-side circuit connected with the secondary-side winding. The secondary-side part of the resonance circuit is located in the post-stage power module 2302. As shown in FIG. 24 which is different from FIG. 23, the preceding-stage power module 2401 contains the primary-side circuit connected with the primary-side winding of the transformer, excluding the primary-side winding of the transformer. The post-stage power module 2402 contains the primary-side winding of the transformer, the secondary-side winding of the transformer and the secondary-side circuit connected with the secondary-side winding.

In some embodiments of the present invention, the power supply system also can contain a first carrier. The preceding-stage power modules and the post-stage power modules can be placed on the first carrier. In one embodiment, at least one post-stage power module can be located on the first surface of the first carrier while at least one preceding-stage power module can be located on the second surface of the first carrier.

In some embodiments of the present invention, the power supply system also can further contain a second carrier. The load can be located on the second carrier while the second carrier can be located between the first carrier and the load. In one embodiment, the preceding-stage power modules and/or the post-stage power modules can be located on the second carrier.

Figure 25:
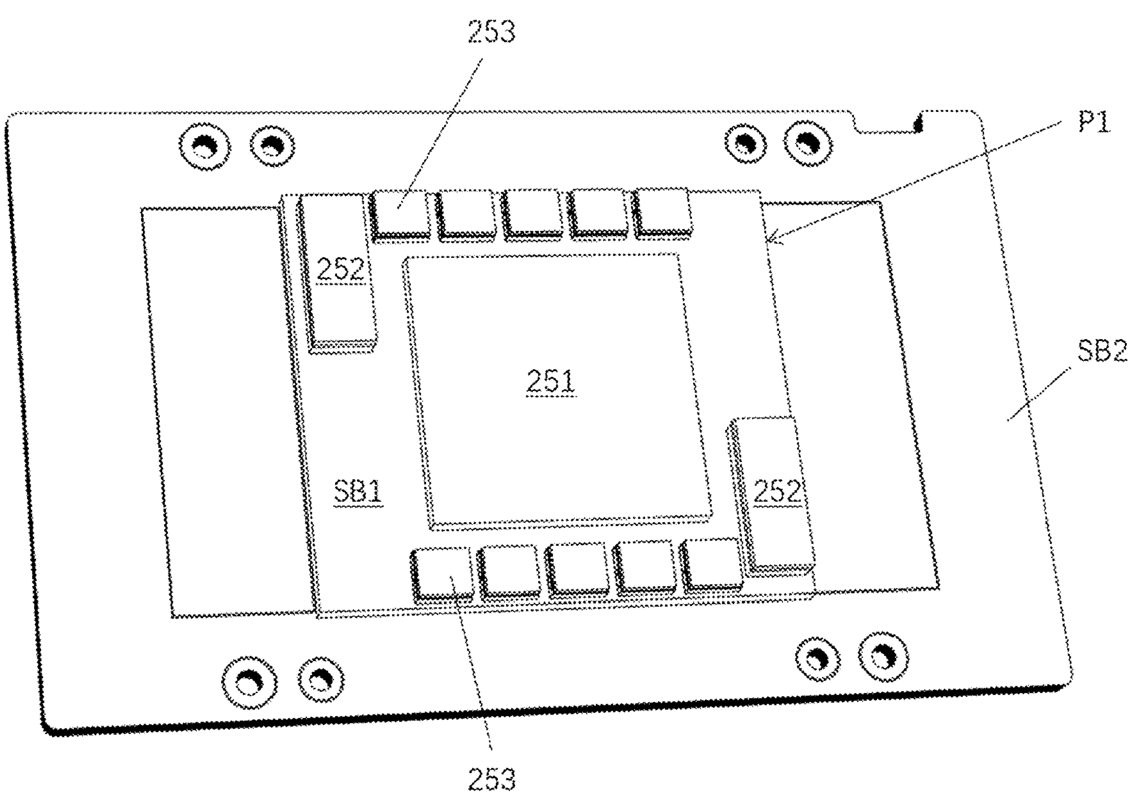
FIG. 25 is a stereogram showing the layout configuration as shown in FIG. 9B according to the present invention.

FIG. 25 shows a stereogram of the structure shown in FIG. 9B. As shown in FIG. 25, a packaging body P1 located on the second carrier SB2 contains the load 251 (such as chip), the preceding-stage power modules 252, the post-stage power modules 253 and the first carrier SB1. The load 251, the preceding-stage power modules 252, the post-stage power modules 253 and the first carrier SB1 may be molded in the packaging body P1, or embedded in the packaging body P1. Certainly, the packaging body P1 also may be an open frame structure. The load 251, the preceding-stage power modules 252 and the post-stage power modules 253 are located on the first carrier SB1. The post-stage power modules 253 are located in the post-stage power supply regions (such as 503 and 505 in FIG. 9B). For example, the post-stage power modules 253 are located on the upper and lower sides of the load 251. The preceding-stage power modules 252 are located in the preceding-stage power supply regions (such as 502 and 504 in FIG. 9B). For example, the preceding-stage power modules 252 are located on the left and right sides of the load 251. The preceding-stage power supply regions and the post-stage power supply regions are arranged in staggered way, and are evenly distributed in the present embodiment. The post-stage power modules (or the post-stage power supply regions) are distributed in an axisymmetric manner with respect to the load region or the load. The preceding-stage power modules are distributed in a centrosymmetric manner with respect to the load region or the load.

Figure 26:
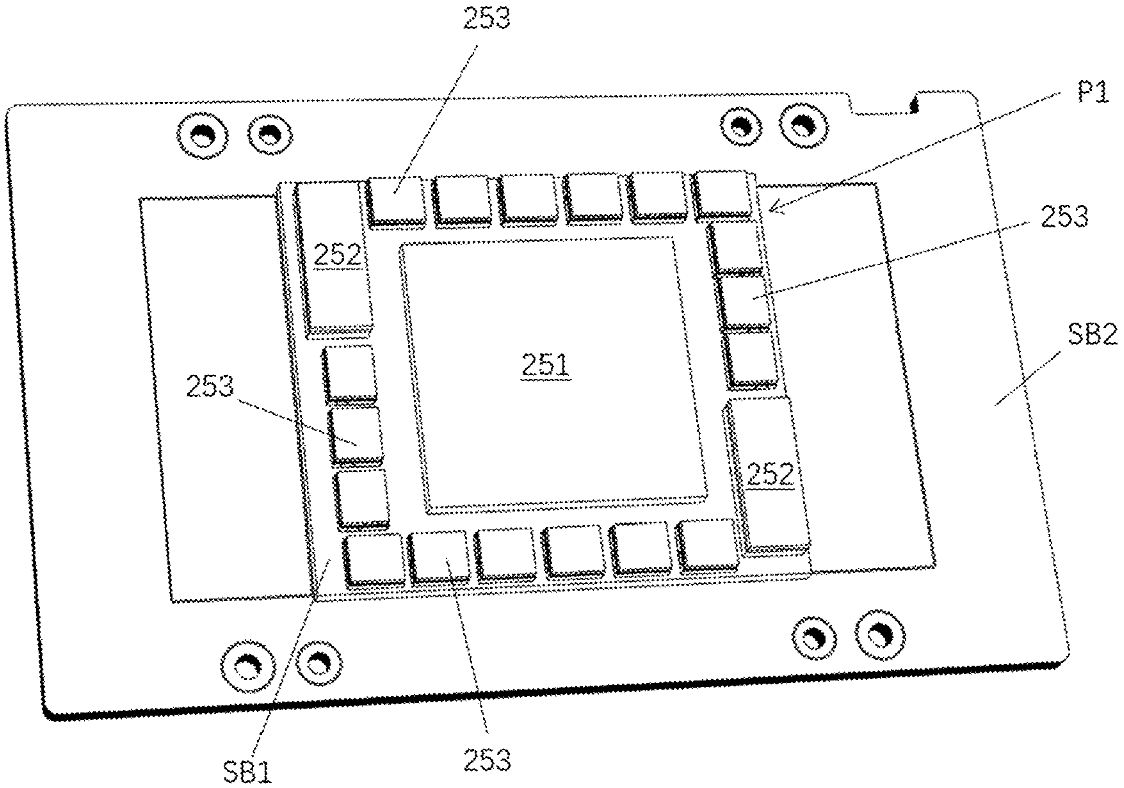
FIG. 26 is a stereogram showing another layout configuration according to the present invention.

FIG. 26 shows a stereogram of another layout configuration. As shown in FIG. 26, the preceding-stage power modules 252 are located in the preceding-stage power supply regions (such as 502 and 504 in FIG. 9B). For example, the preceding-stage power modules are located on the left and right sides of the load 251. The post-stage power modules 253 are located in the post-stage power supply regions (such as 503 and 505 in FIG. 9B). The preceding-stage power supply regions and the post-stage power supply regions are disposed around the load region (such as 501 in FIG. 9B) in staggered way, and evenly distributed. The difference between FIG. 26 and FIG. 25 is that: the post-stage power supply regions where the post-stage power modules 253 are located cover the upper and lower sides of the load 251, one part of the left side on the load 251 and one part of the right side on the load 251. In such layout configuration, the preceding and post-stage power supply regions or the preceding and post-stage power modules are distributed in a centrosymmetric manner with respect to the load region or the load.

Figure 27:
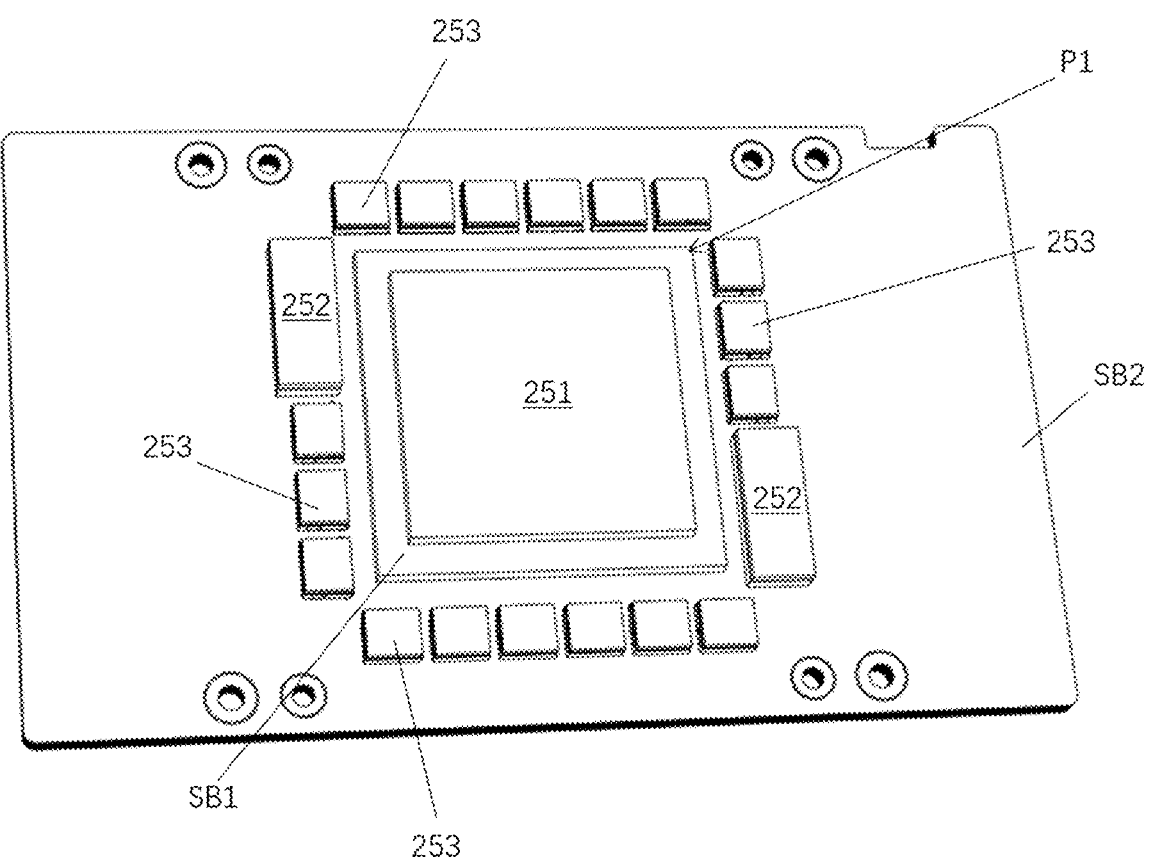
FIG. 27 is a stereogram showing another layout configuration according to the present invention.

FIG. 27 shows a stereogram of another layout configuration. The difference between FIG. 27 and FIG. 26 is that: the packaging body P1 contains the load 251 (such as chip) and the first carrier SB1, and the preceding-stage power modules 252 and the post-stage power modules 253 are located outside the packaging body P1. For example, the load 251 is located on the first carrier SB1 and packaged into the packaging body P1 while the preceding-stage power modules 252 and the post-stage power modules 253 are located on the second carrier SB2.

Figure 28A:
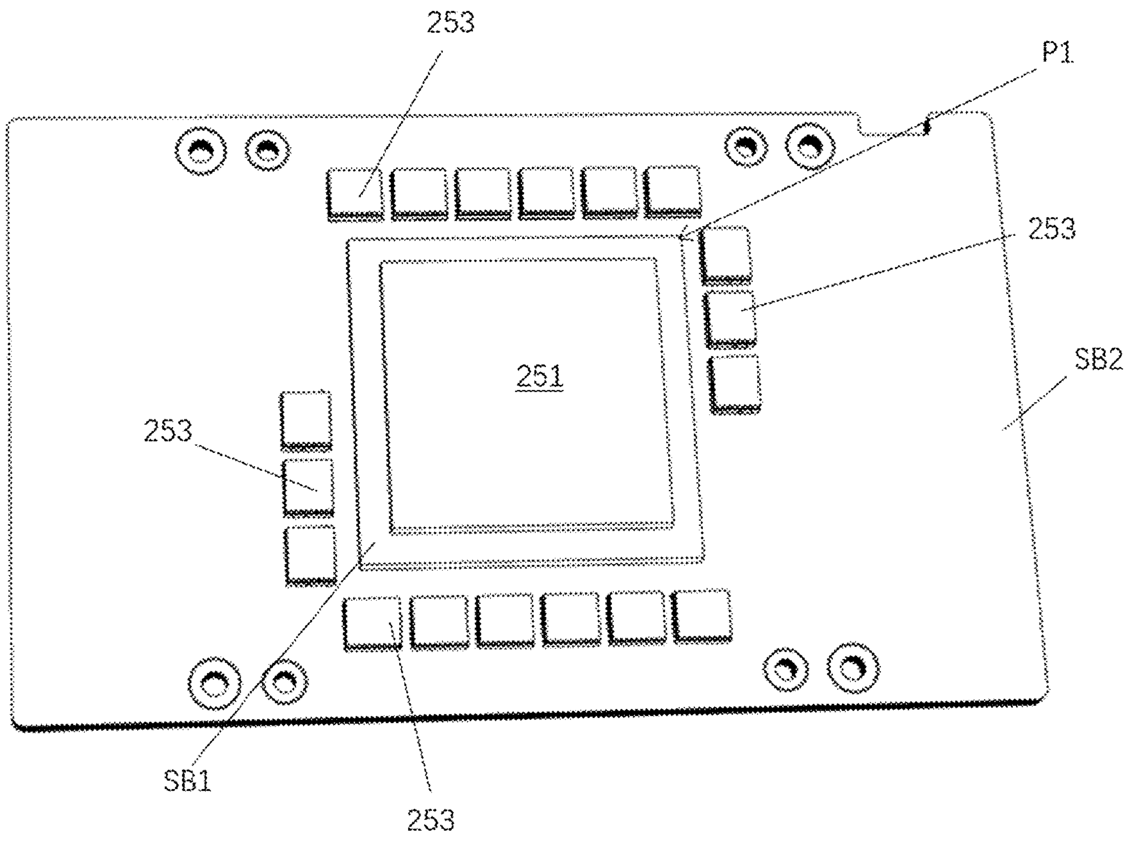
FIG. 28A is a stereogram showing yet another layout configuration according to the present invention.
Figure 28B:
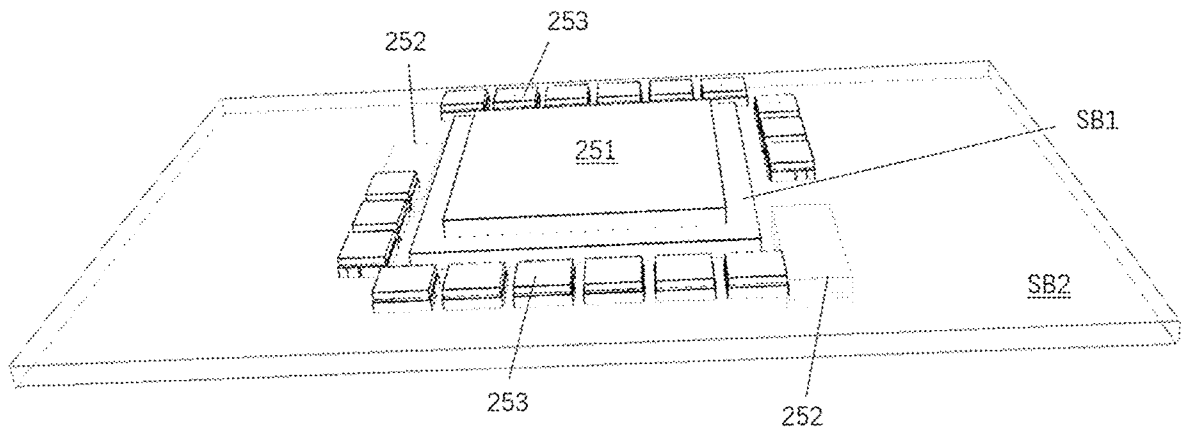
FIG. 28B is a perspective view showing the layout configuration in FIG. 28A.

FIG. 28A shows a stereogram of yet another layout configuration, and FIG. 28B shows a perspective view of the structure shown in FIG. 28A. As shown in FIGS. 28A and 28B, the preceding-stage power modules 252 are located in the preceding-stage power supply regions, the post-stage power modules 253 are located in the post-stage power supply regions, and the preceding-stage power modules 252 and the post-stage power modules 253 are located on the second carrier SB2. The load 251 (such as chip) in the load region is located on the first carrier SB1. The preceding-stage power supply regions and the post-stage power supply regions are disposed around the load region in staggered way. The difference between the layout configuration shown in FIGS. 28A and 28B and the structure shown in FIG. 27 is that the preceding-stage power modules 252 and the post-stage power modules 253 are respectively located on the upper and lower surfaces of the second carrier SB2. For example, the post-stage power modules 253 are located on the upper surface of the second carrier SB2, and the preceding-stage power modules 252 are located on the lower surface of the second carrier SB2. Certainly, it can be understood that in other embodiments, the post-stage power modules 253 may be arranged on the lower surface of the second carrier SB2 while the preceding-stage power modules 252 may be arranged on the upper surface of the second carrier SB2, which is not limited in the prevent invention. In the present invention, regardless of the position of the preceding-stage power modules 252 or the post-stage power modules 253, the projection of the preceding-stage power supply regions where the preceding-stage power modules are located and the projection of the post-stage power supply regions where the post-stage power modules are located, always form the staggered arrangement around the load region, on the second carrier SB2.

Figure 29:
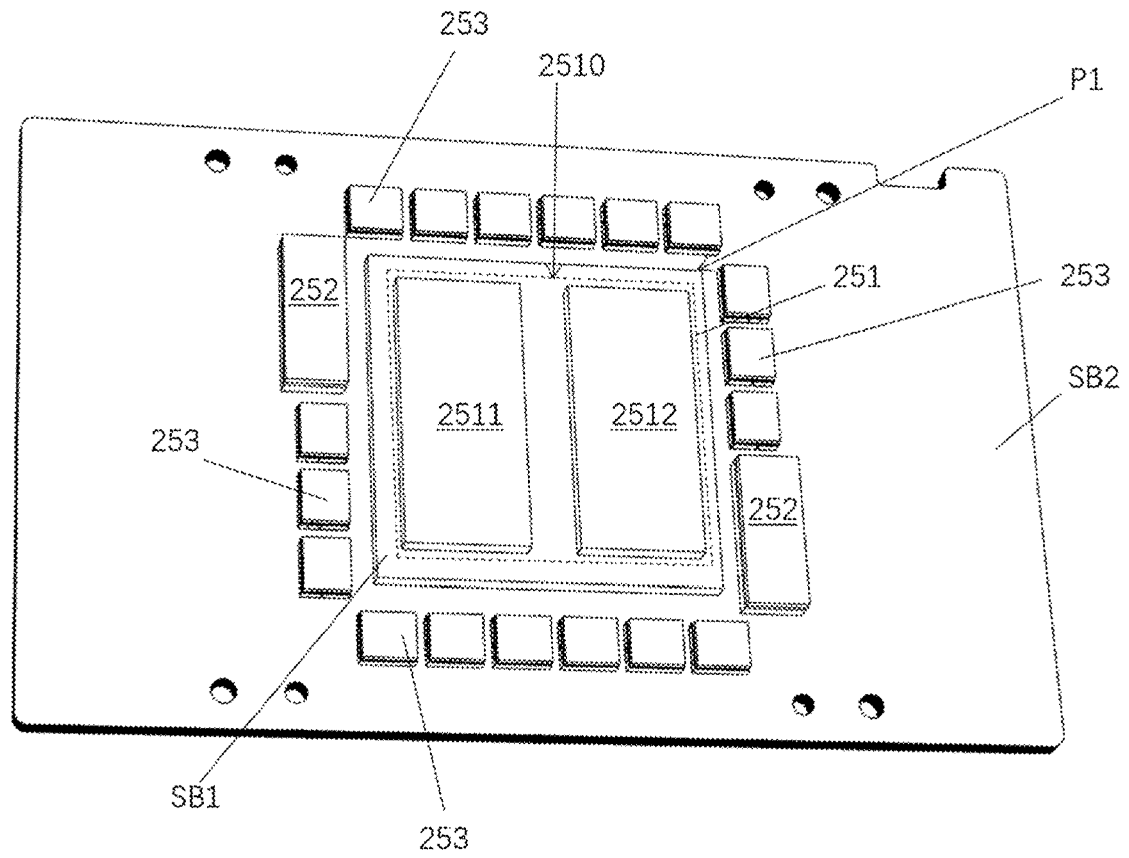
FIG. 29 is a stereogram showing another layout configuration according to the present invention.

FIG. 29 shows a stereogram of another layout configuration. The difference between FIG. 29 and FIG. 27 is that the load 251 (such as chip) in the load region includes a plurality of loads. For example, the load 251 includes a first load 2511 (such as a first chip) and a second load 2512 (such as a second chip). The loads 2511 and 2512 may be located on the first carrier SB1, and packaged into the packaging body P1. The preceding-stage power modules 252 and the post-stage power modules 253 are located on the second carrier SB2.

In other embodiments of the present invention, the loads may be located in a packaging body, such as the load 251 shown in FIGS. 28A and 28B. The load 251 may include a plurality of chips which may be located in the same packaging body P1. The loads may be located in a plurality of packaging bodies. The load 251 (such as chips) may include the first load 2511 (such as the first chip) and the second load 2512 (such as the second chip), such as the load 251 shown in FIG. 29. For example, the first load 2511 and the second load 2512 can be located in a plurality of packaging bodies.

Figure 30:
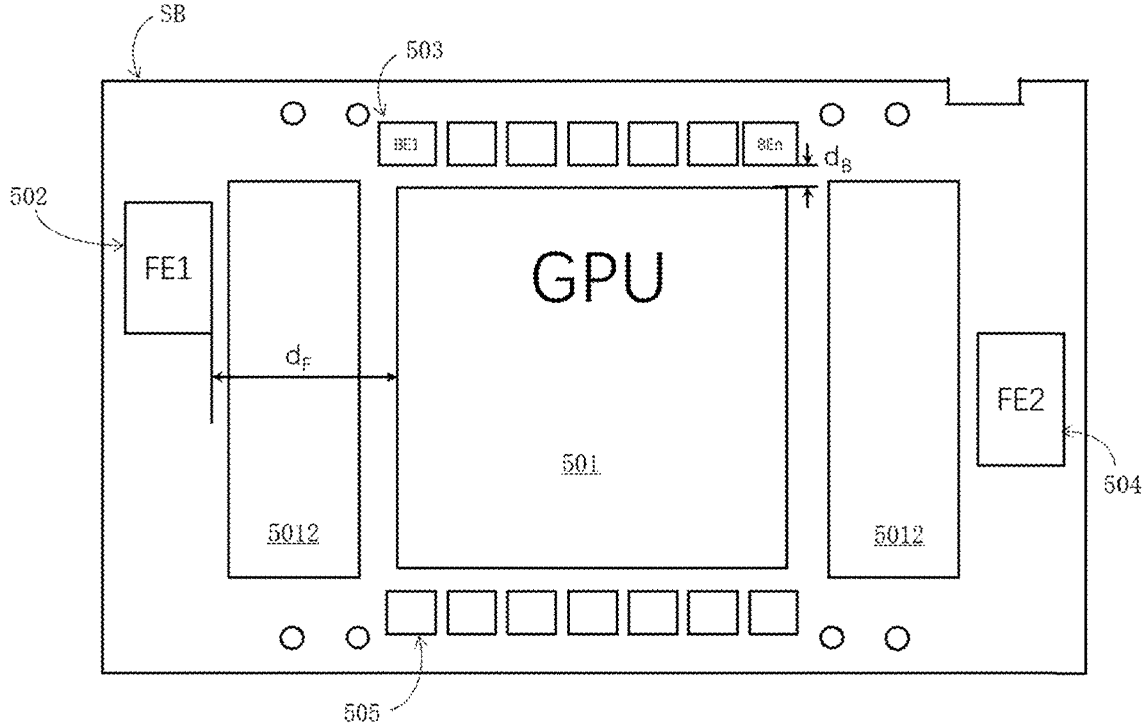
FIG. 30 is a schematic diagram showing a layout configuration according to the present invention.
Figure 31:
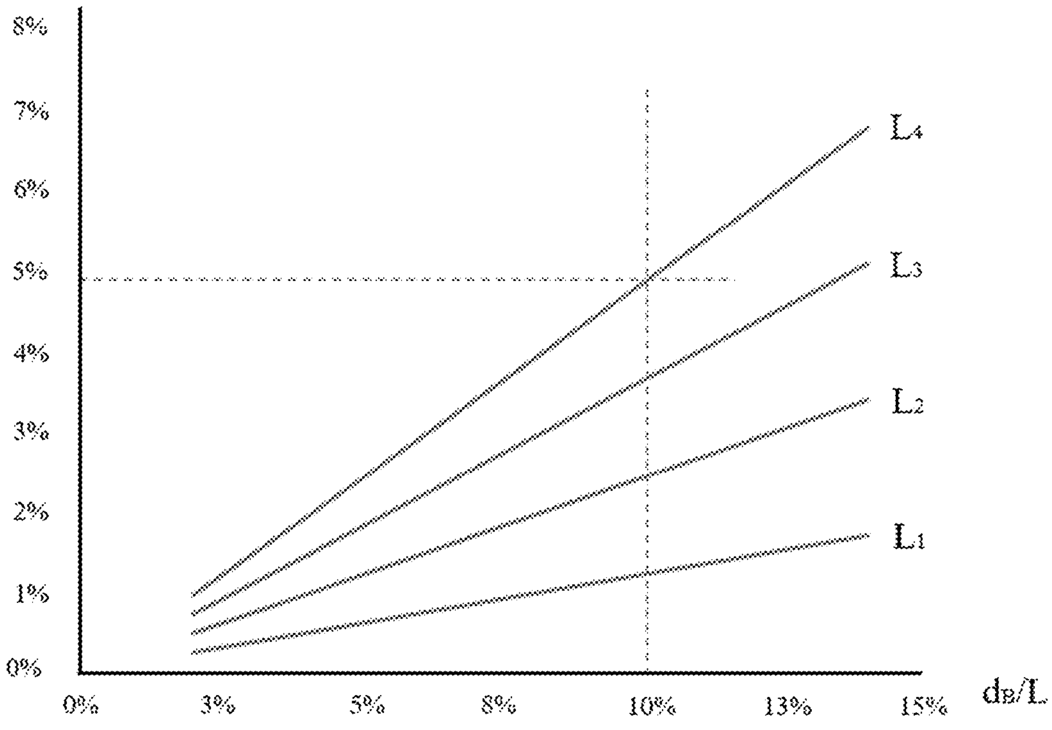
FIG. 31 is a schematic diagram showing curves obtained by evaluating the efficiency losses with the perimeters 1 of different load regions and the distance d B in the layout configuration as shown in FIG. 30.

In the embodiments, as shown in FIG. 30, a distance from any post-stage power module to the load region is defined as d B, and a distance from any preceding-stage power module to the load region is defined as $d_F$. And the perimeter of the load region is L. Then either the variation of the perimeter L of the load region or the variation of the distance d B will cause a change of efficiency losses on output PDN. The efficiency losses are evaluated in the case of different L and different d B. Then, the corresponding curve is shown in FIG. 31, wherein x-axis represents d B/L that is the ratio of the distance d B to the perimeter L and y-axis represents the ratio of the loss over the delivery network PDN between the preceding and post-stage power modules to the output power of the post-stage power modules. $L_1$, $L_2$, $L_3$ and $L_4$ are the parametric variables and represents the perimeters of different load regions. And $L_4>L_3>L_2>L_1$. As shown in FIG. 31, the ratio of the loss over the delivery network PDN to the output power of the post-stage power modules will be more than 5% when d B/L is more than 10%.

Figure 32:
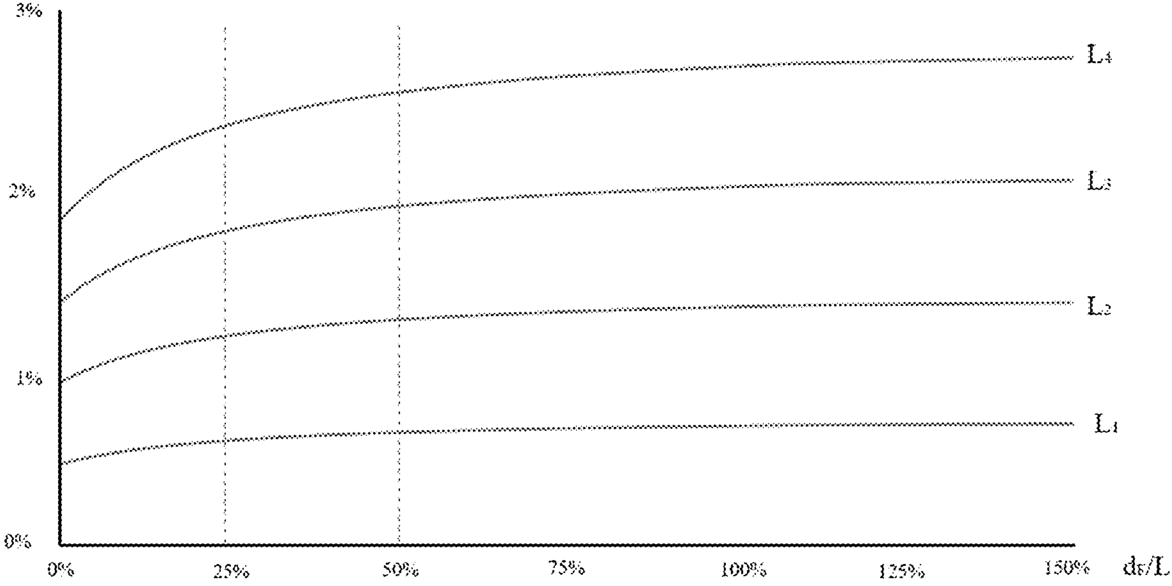
FIG. 32 is a schematic diagram showing the influence of the distance $d_F$ between the preceding-stage power module and the load region to the loss over the delivery network PDN in the layout configuration as shown in FIG. 30.

FIG. 32 shows that the effect of the distance $d_F$ on the loss over the delivery network PDN. As shown in FIG. 32, x-axis represents $d_F/L$ that is the ratio of the distance $d_F$ to the perimeter L of the load region; and y-axis represents the ratio of the loss over the delivery network PDN between the preceding and post-stage power modules to the output power of the post-stage power modules. Here, $L_1$, $L_2$, $L_3$ and $L_4$ are the parametric variables and represents the perimeters of different load regions. And $L_4>L_3>L_2>L_1$. According to FIG. 32, the ratio of the loss over the delivery network PDN between the preceding and post-stage power modules to the output power of the post-stage power modules increases with the increase in $d_F/L$. The ratio increases rapidly when $d_F/L$ is less than 25%, increases slowly when $d_F/L$ is more than 25% and gradually remains unchanged when $d_F/L$ is more than 50%. When the preceding and post-stage power supply regions are arranged in staggered way to supply power to the load, the loss over the delivery network PDN increases rapidly with the increase in the distance between the preceding-stage power modules and the load region when $d_F/L$ is less than 25%, slowly increases with the increase in the distance when $d_F/L$ is more than 25%, and gradually remains unchanged with the increase in the distance when $d_F/L$ is more than 50%. That is to say, the loss over the delivery network between the preceding and post-stage power modules is insensitive to the distance $d_F$ when $d_F/L$ is more than 50%.

The distance between the post-stage power module and the load region refers to the minimum of the distances from any point on the boundary of the vertical projection region of the post-stage power module on the carrier to any point on the boundary of the vertical projection region of the load region on the carrier. Similarly, the distance between the preceding-stage power module and the load region refers to the minimum of the distances from any point on the boundary of the vertical projection region of the preceding-stage power module on the carrier to any point on the boundary of the vertical projection region of the load region on the carrier.

The load region will be slightly different when the locations of the preceding-stage power modules, the post-stage power modules or the load are different. When the load is located on the first carrier SB1 and the preceding-stage power modules and/or the post-stage power modules are also located on the first carrier SB1, the load region is correspondingly the orthographic projection of the load on the first carrier SB1. That is to say, when the preceding-stage power modules and/or the post-stage power modules and the load are on the same carrier, the load region is correspondingly the orthographic projection of the load on the plane of the first carrier SB1. For example, as shown in FIGS. 25 and 26, the preceding-stage power modules 252, the post-stage power modules 253 and the load are arranged together on the first carrier SB1, and the load region is correspondingly the orthographic projection of the load 251 (such as chip) on the first carrier SB1 or the second carrier SB2. In another embodiment, only the post-stage power modules and the load (such as chip) are located together on the carrier while the preceding-stage power modules are located outside the carrier of the load. For example, the post-stage power modules 253 and the load 251 (such as chip) are located on the first carrier SB1 while the preceding-stage power modules 252 are located on the second carrier SB2. The load region is correspondingly the orthographic projection of the load 251 on the first carrier SB1 or the second carrier SB2. In yet another embodiment, the load includes a plurality of chips. For example, the load includes the first load 2511 and the second load 2512 in FIG. 29, and the boundary of the load region is correspondingly to the envelope line 2510 of the orthographic projection of the first load 2511 and the second load 2512 (such as two chips) on the first carrier SB1 or the second carrier SB2.

If the load is located on the first carrier SB1 while the preceding-stage power modules and the post-stage power modules are located on the second carrier SB2, the load region is correspondingly the orthographic projection of the first carrier SB1 on the second carrier SB2. For example, as shown in FIG. 27, the load 251 (such as a chip) is located on the first carrier while the preceding-stage power modules 252 and the post-stage power modules 253 are located on the second carrier SB2. In this structure, the load region is correspondingly the orthographic projection of the first carrier SB1 on the second carrier SB2. The load 251 is located on the first carrier SB1.

According to the embodiments, compared with the prior art, the structure where the preceding-stage power supply regions and the post-stage power supply regions are arranged in staggered way to supply power to the load can reduce the loss over the delivery network between the preceding-stage power modules and the post-stage power modules, thereby reducing the loss of the entire power supply architecture. Especially when the distance between the preceding-stage power module and the load region is less than or equal to 50% of L, and the distance between the post-stage power module and the load region is less than or equal to 10% of L, the above improvement is more significant.

In the embodiments, a plurality of the preceding-stage power supply regions and a plurality of post-stage power supply regions are arranged in staggered way. A plurality of the post-stage power modules in the plurality of post-stage power supply regions can supply power together to the same load. The power among the plurality of the post-stage power modules can be assigned in a certain proportion. For example, the output power of respective post-stage power modules are substantially equal. For example, the post-stage power modules in one post-stage power supply region supply the power in a steady state to a load while the post-stage power modules in another post-stage power supply region supply power in a dynamic condition to the load. For example, one post-stage power supply region includes a plurality of the post-stage power modules, some post-stage power modules in the post-stage power supply region supply the power in the steady state to the load while other post-stage power modules in the post-stage power supply region supply the power in the dynamic condition to the load.

The power supply system of the present invention can be used for achieving the power supply architecture shown in FIG. 1, and also for achieving other circuit architectures.

Figure 33:
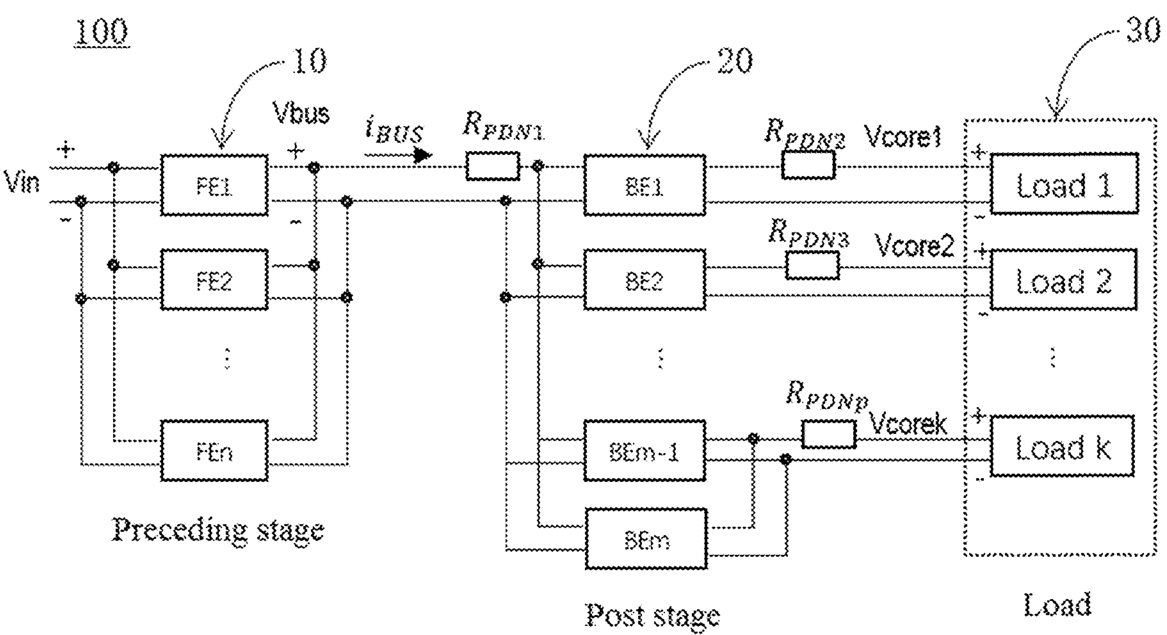
FIG. 33 is a schematic diagram showing another architecture of the power supply system according to the present invention, in which m post-stage power modules supply power to k loads respectively.

FIG. 33 shows another architecture of the power supply system of the present invention. As shown in FIG. 33, n preceding-stage power modules 10 in the preceding-stage power supply regions and m post-stage power modules 20 in the post-stage power supply regions are cascaded to supply power to the load 30. For example, n preceding-stage power modules 10 are the circuits FE1 to FEn in the preceding-stage power supply regions, m post-stage power modules 20 are the circuits BE1 to BEm in the post-stage power supply regions, and the load 30 is the loads Load 1 to Load k in the load region. The difference between the architecture shown in FIG. 33 and the architecture shown in FIG. 1 is that m post-stage power modules BE1 to BEm in the post-stage power supply regions supply power to k loads Load 1 to Load k, respectively. The post-stage power module BE1 supplies power to the Load 1; the post-stage power module BE2 supplies power to the Load 2; and the post-stage power modules BEm−1 and BEm are connected in parallel to supply power to the Load k. In the present embodiment, a plurality of loads work coordinately. For example, the Load 1 may be Serdes (Serializer-deserializer), the Load 2 may be the memory (HBM), and the Load k may be Core of GPU. Serdes is used for decoding the external serial communication into the internal parallel signal, the memory (HBM) is used for completing data loading, etc., and Core is used for completing the data computation and for the real time interaction with the memory (HBM). The loads can be driven by a high-speed clock. The complex algorithm can be then achieved finally after computation, storage and forwarding.

Figure 34:
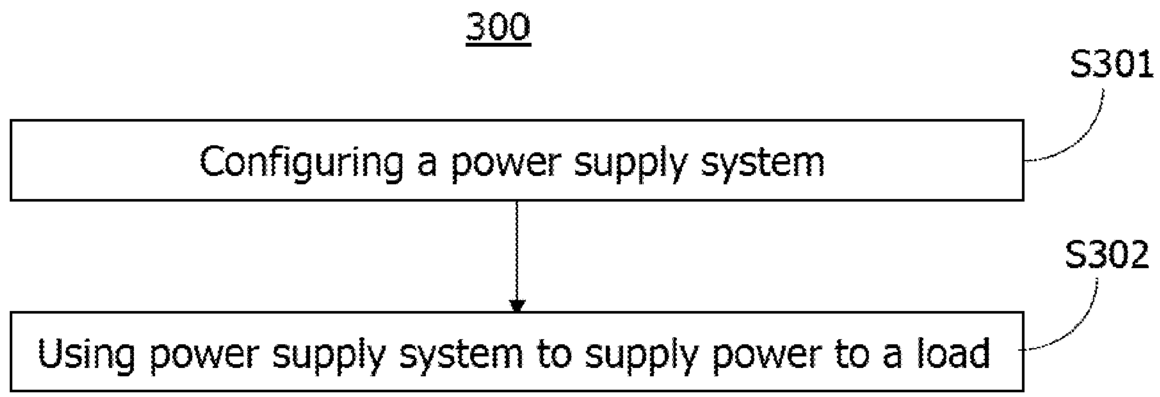
FIG. 34 is a flow chart showing the power supply method according to the present invention.

As shown in FIG. 34, the present invention further provides a power supply method. The method includes the following steps.

Step S301: configure a power supply system. The power supply system may be the power supply systems described in the above-mentioned various embodiments.

Step S302: use the power supply system to supply power to the load.

The embodiments of the present invention are described and illustrated above in detail. It should be understood that the present invention is not limited to the disclosed embodiments, on the contrary, the present invention covers various modifications and equivalent arrangements within the spirit or scope of the claims attached herein.

What is claimed is:

1. A power supply system, comprising:

a load region, and a load disposed in the load region;

at least two preceding-stage power supply regions disposed around the load region;

preceding-stage power modules disposed in the at least two preceding-stage power supply regions;

at least two post-stage power supply regions disposed around the load region; and post-stage power modules disposed in the at least two post-stage power supply regions;

wherein the at least two preceding-stage power supply regions and the at least two post-stage power supply regions are disposed around the load region in a staggered arrangement manner; and wherein the preceding-stage power module and the post-stage power module are cascaded to supply power to the load.

2. The power supply system according to claim 1, wherein the at least two preceding-stage power supply regions are distributed in an axisymmetric manner with respect to the load region; and/or the at least two post-stage power supply regions are distributed in an axisymmetric manner with respect to the load region.

3. The power supply system according to claim 1, wherein the power supply system comprises a first preceding-stage power supply region, a second preceding-stage power supply region, a first post-stage power supply region and a second post-stage power supply region;

wherein the first post-stage power supply region and the second post-stage power supply region are distributed in an axisymmetric manner with respect to the load region; and wherein the first preceding-stage power supply region and the second preceding-stage power supply region are distributed in the axisymmetric manner with respect to the load region.

4. The power supply system according to claim 1, wherein the at least two preceding-stage power supply regions are distributed in a centrosymmetric manner with respect to the load region; and/or the at least two post-stage power supply regions are distributed in a centrosymmetric manner with respect to the load region.

5. The power supply system according to claim 1, wherein the at least two preceding-stage power supply regions are distributed in an axisymmetric manner with respect to the load region, and the at least two post-stage power supply regions are distributed in a centrosymmetric manner with respect to the load region; or the at least two preceding-stage power supply regions are distributed in the centrosymmetric manner with respect to the load region, and the at least two post-stage power supply regions are distributed in the axisymmetric manner with respect to the load region.

6. The power supply system according to claim 1, wherein the at least two preceding-stage power supply regions are evenly distributed around the load region, and/or the at least two post-stage power supply regions are evenly distributed around the load region.

7. The power supply system according to claim 1, wherein a length of at least one of the post-stage power supply regions is greater than or equal to that of at least one of the preceding-stage power supply regions.

8. The power supply system according to claim 1, wherein the preceding-stage power module is electrically connected to the post-stage power module through a first power delivery network, and the post-stage power module is electrically connected to the load through a second power delivery network.

9. The power supply system according to claim 1, wherein the load region comprises a plurality of loads working coordinately.

10. The power supply system according to claim 1, wherein the power supply system further comprises a first carrier, and the load, the preceding-stage power module and the post-stage power module are disposed on the first carrier.

11. The power supply system according to claim 10, wherein at least one of the post-stage power modules is positioned on a first surface of the first carrier, and at least one of the preceding-stage power modules is positioned on a second surface of the first carrier.

12. The power supply system according to claim 1, wherein the power supply system further comprises a first carrier and a second carrier, the first carrier is disposed on the second carrier, and the preceding-stage power module and/or the post-stage power module are disposed on the second carrier.

13. The power supply system according to claim 1, wherein each of the preceding-stage power supply regions comprises a plurality of the preceding-stage power modules, and there is a constant space between any adjacent preceding-stage power modules; and each of the post-stage power supply regions comprises a plurality of the post-stage power modules, and there is a constant space between any adjacent post-stage power modules.

14. The power supply system according to claim 13, wherein the space between the adjacent preceding-stage power modules is a first gap, and the first gap is less than one fifth of a length of the preceding-stage power module.

15. The power supply system according to claim 13, wherein the space between the adjacent post-stage power modules is a second gap, and the second gap is less than one fifth of a length of the post-stage power module.

16. The power supply system according to claim 1, wherein the post-stage power module is a regulated DC/DC circuit, and the preceding-stage power module is an unregulated DC/DC circuit; or the post-stage power module is an unregulated DC/DC circuit, and the preceding-stage power supply module is a regulated DC/DC circuit; or the post-stage power module comprises a secondary-side circuit of an unregulated DC/DC circuit, and the preceding-stage power module comprises a primary-side circuit of the unregulated DC/DC circuit.

17. The power supply system according to claim 1, wherein an impedance of the post-stage power supply region is greater than or equal to an impedance of the preceding-stage power supply region.

18. The power supply system according to claim 1, wherein a ratio of a distance between the post-stage power module and the load region to a perimeter of the load region is less than 10%.

19. The power supply system according to claim 1, wherein a ratio of a distance between the preceding-stage power module and the load region to a perimeter of the load region is less than 25%.

20. A power supply method, comprising:

configuring a power supply system which comprises a load region and a load disposed in the load region;

disposing at least two preceding-stage power supply regions around the load region;

disposing preceding-stage power modules in the at least two preceding-stage power supply regions;

disposing at least two post-stage power supply regions around the load region;

disposing post-stage power modules in the at least two post-stage power supply regions;

disposing the at least two preceding-stage power supply regions and the at least two post-stage power supply regions around the load region in a staggered arrangement manner; and cascading the preceding-stage power module and the post-stage power module to supply power to the load.

* * * * *